July 4, 1967 R. D. ANDERSON 3,329,252
CELLULOSIC PRODUCT ACCUMULATOR AND PACKAGER
Filed April 21, 1964 16 Sheets-Sheet 1
FIG. 2
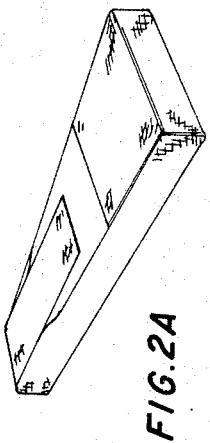
FIG. 2A
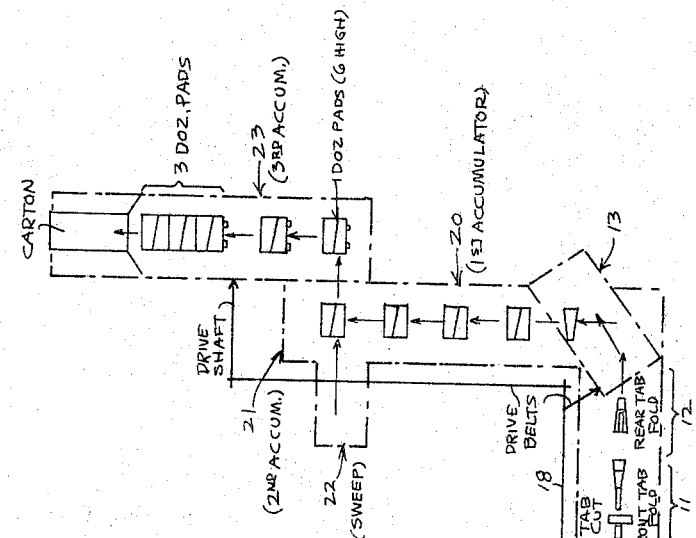
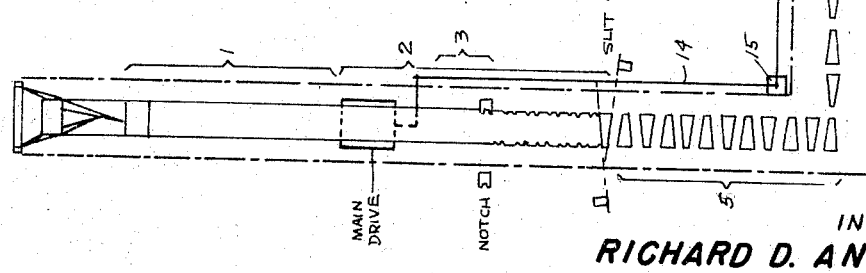
FIG. 1
INVENTOR
RICHARD D. ANDERSON

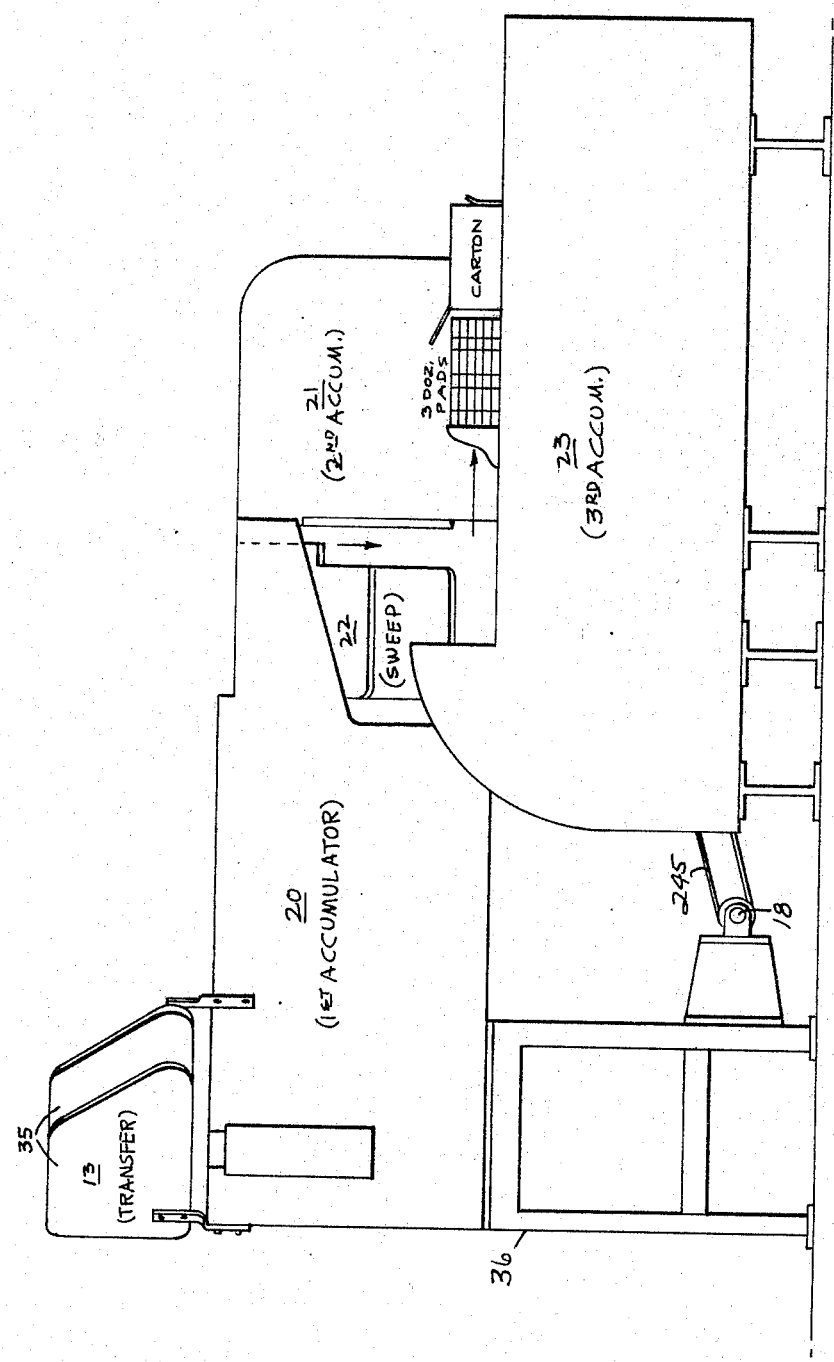

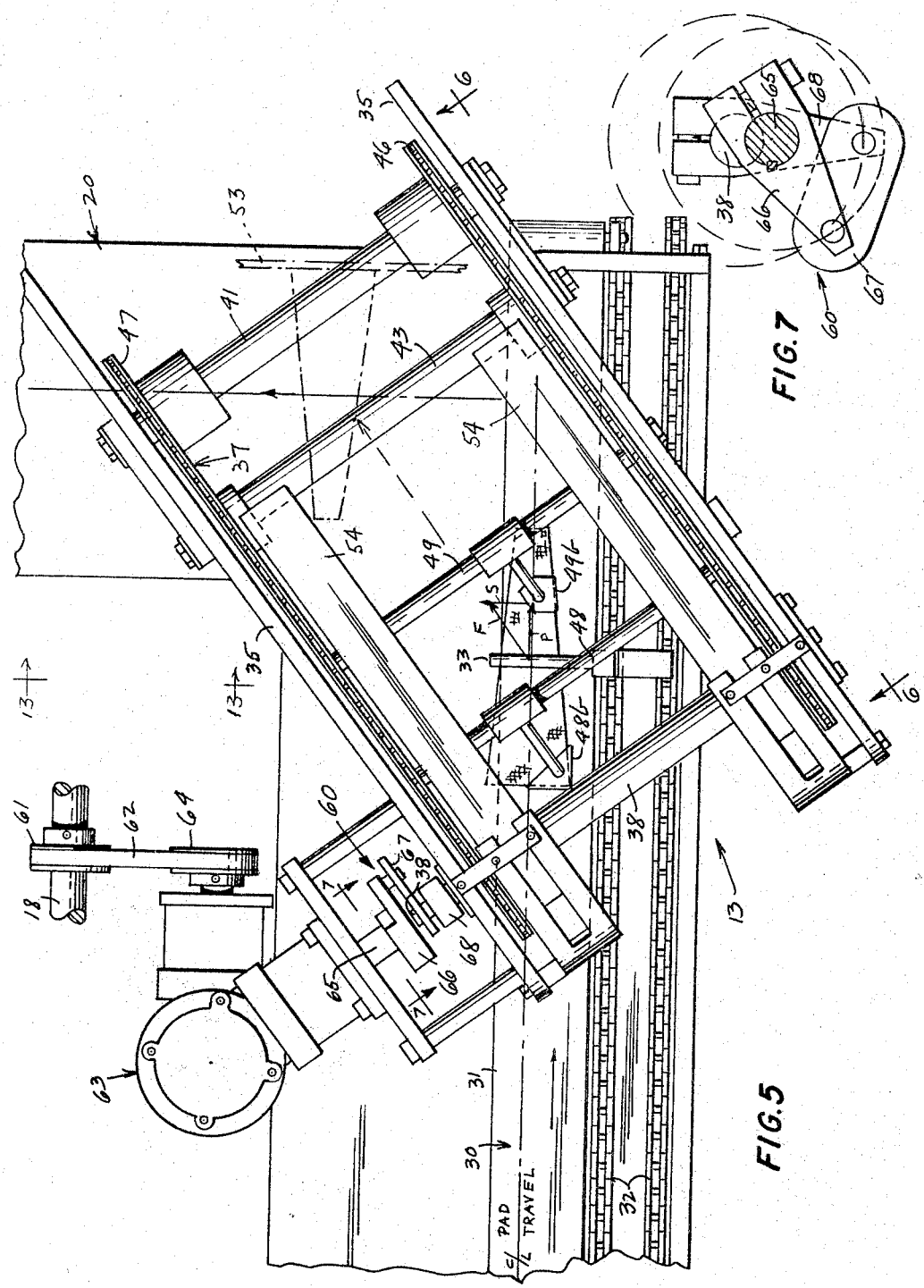

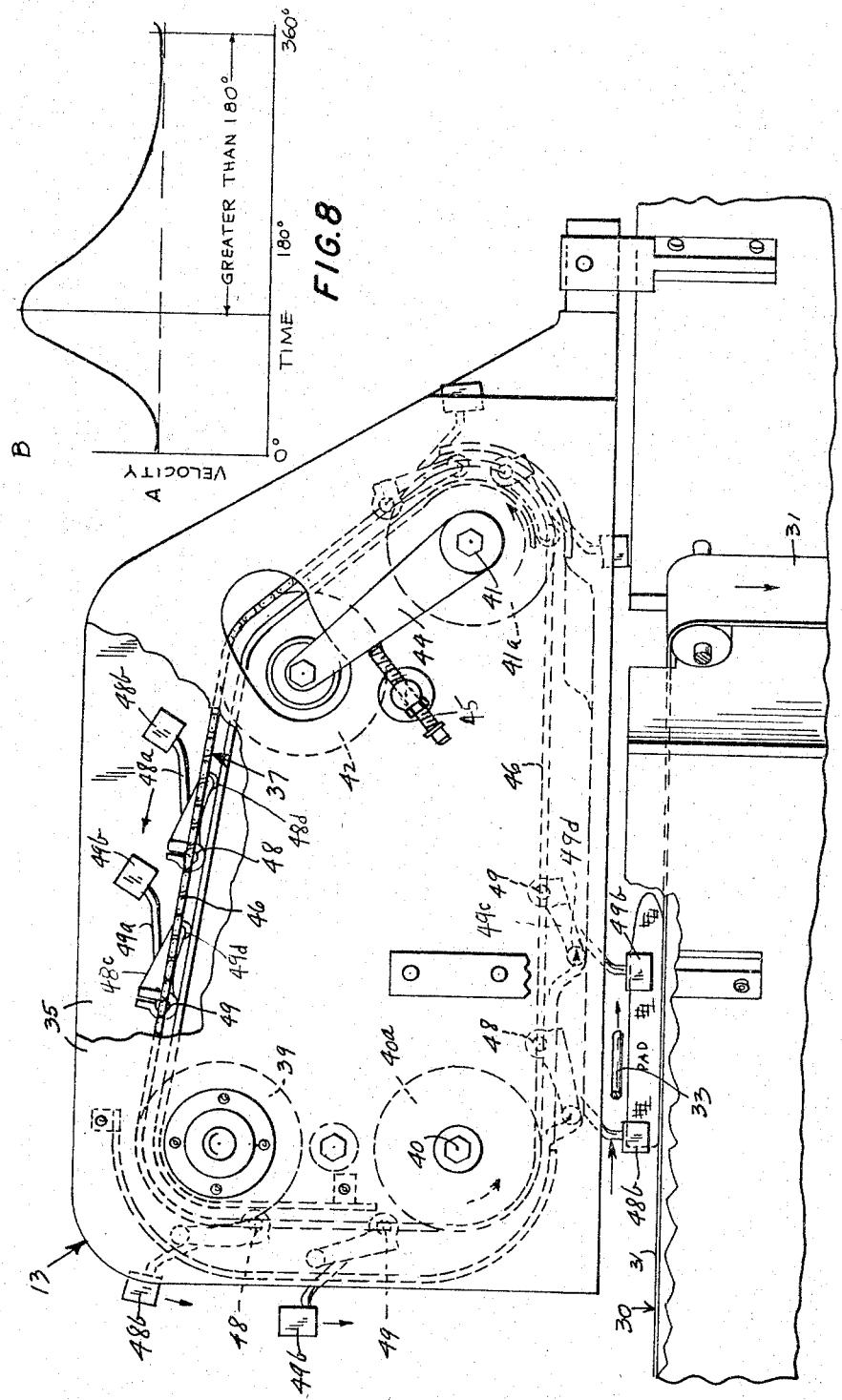

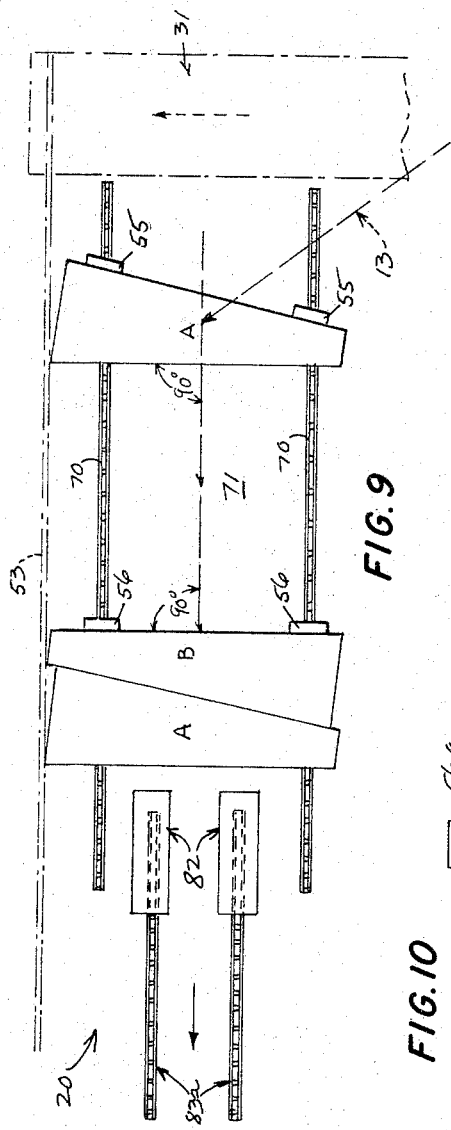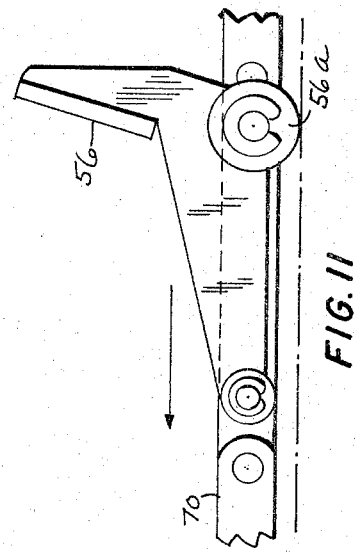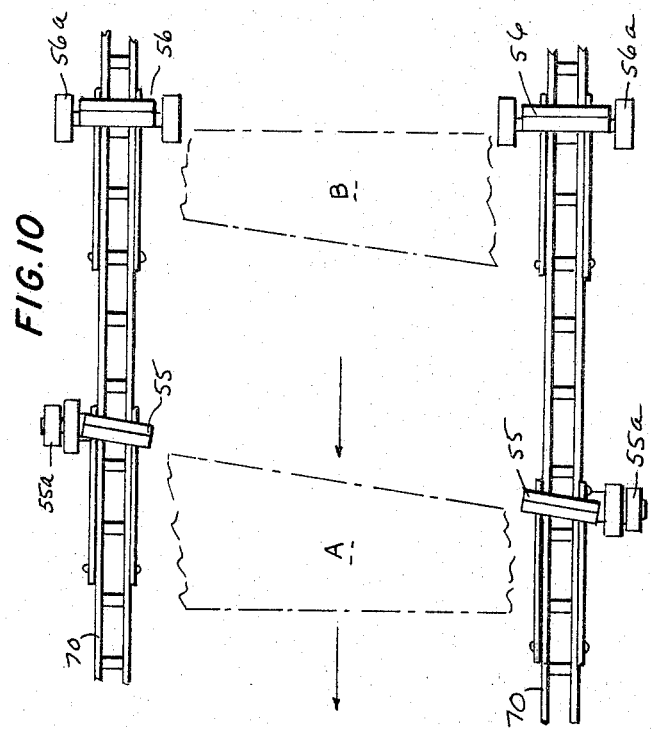

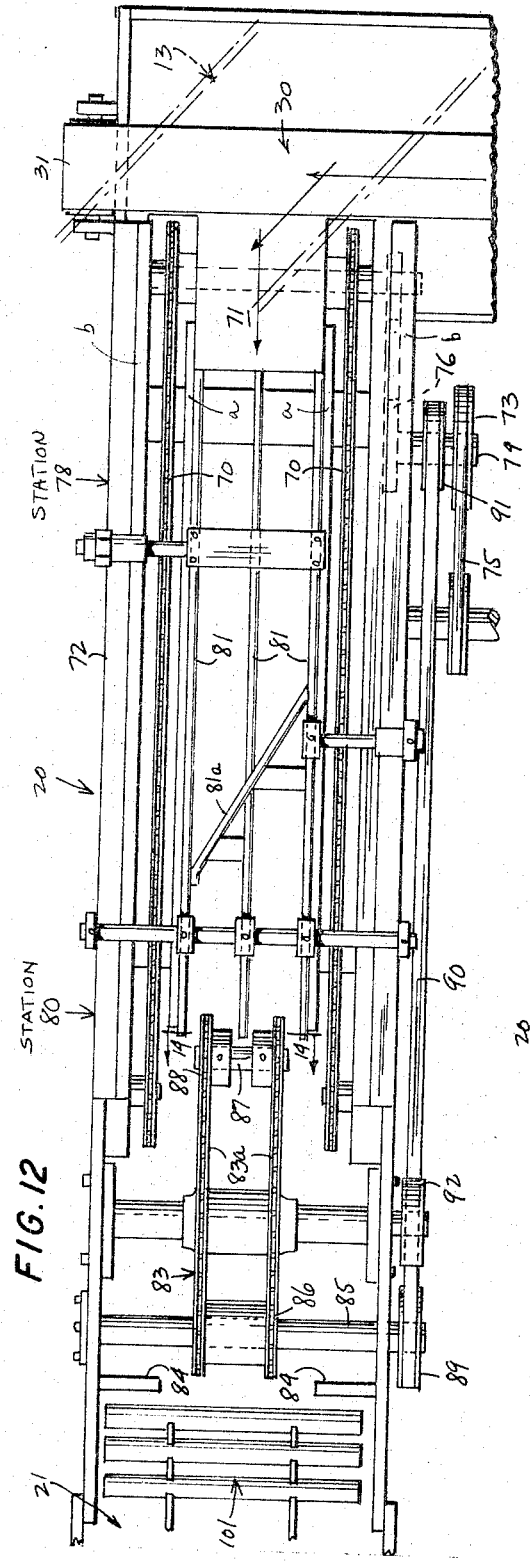

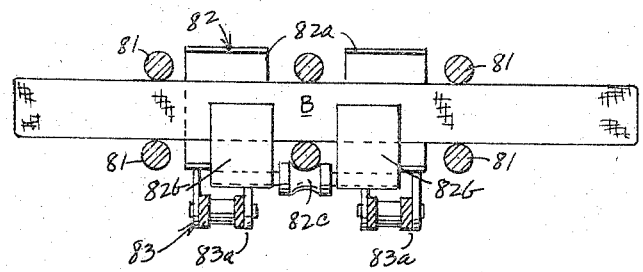
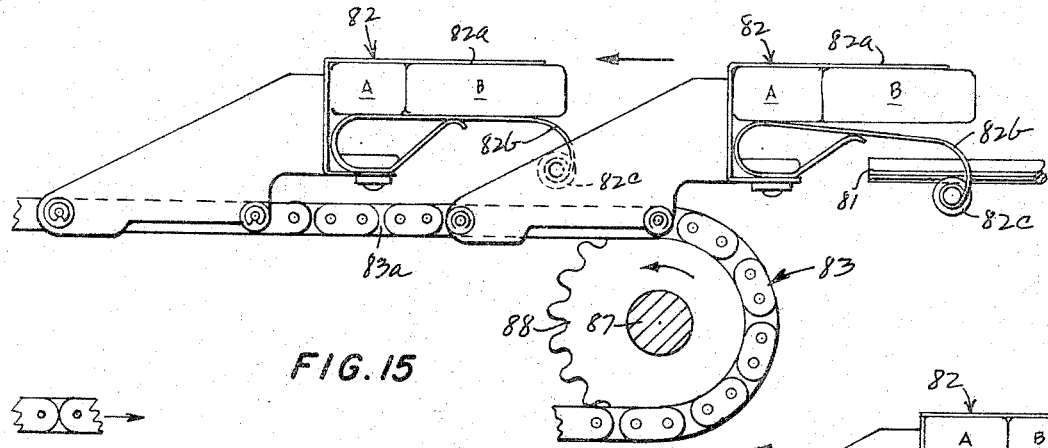
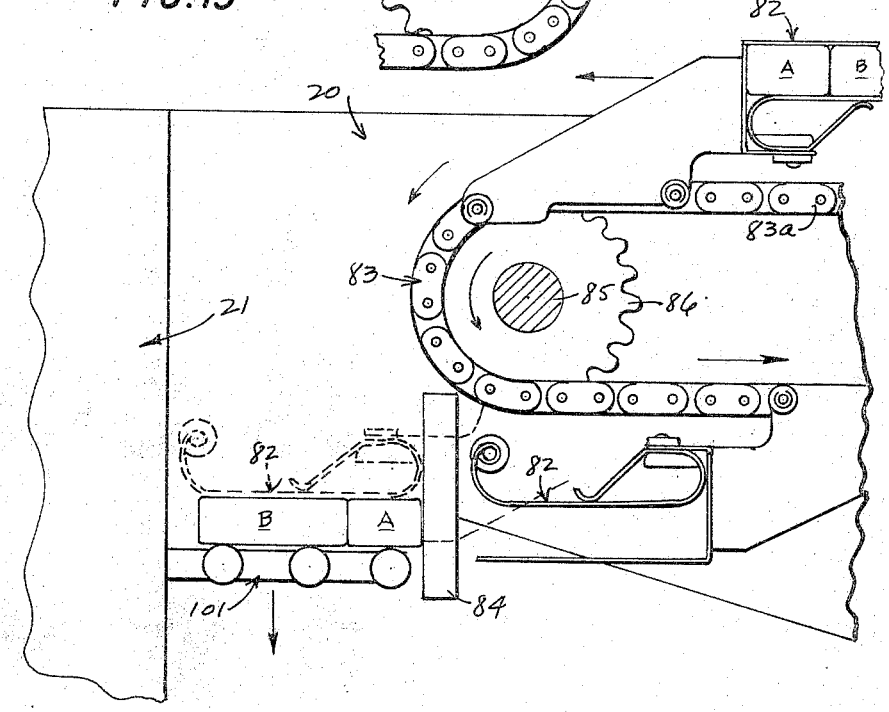

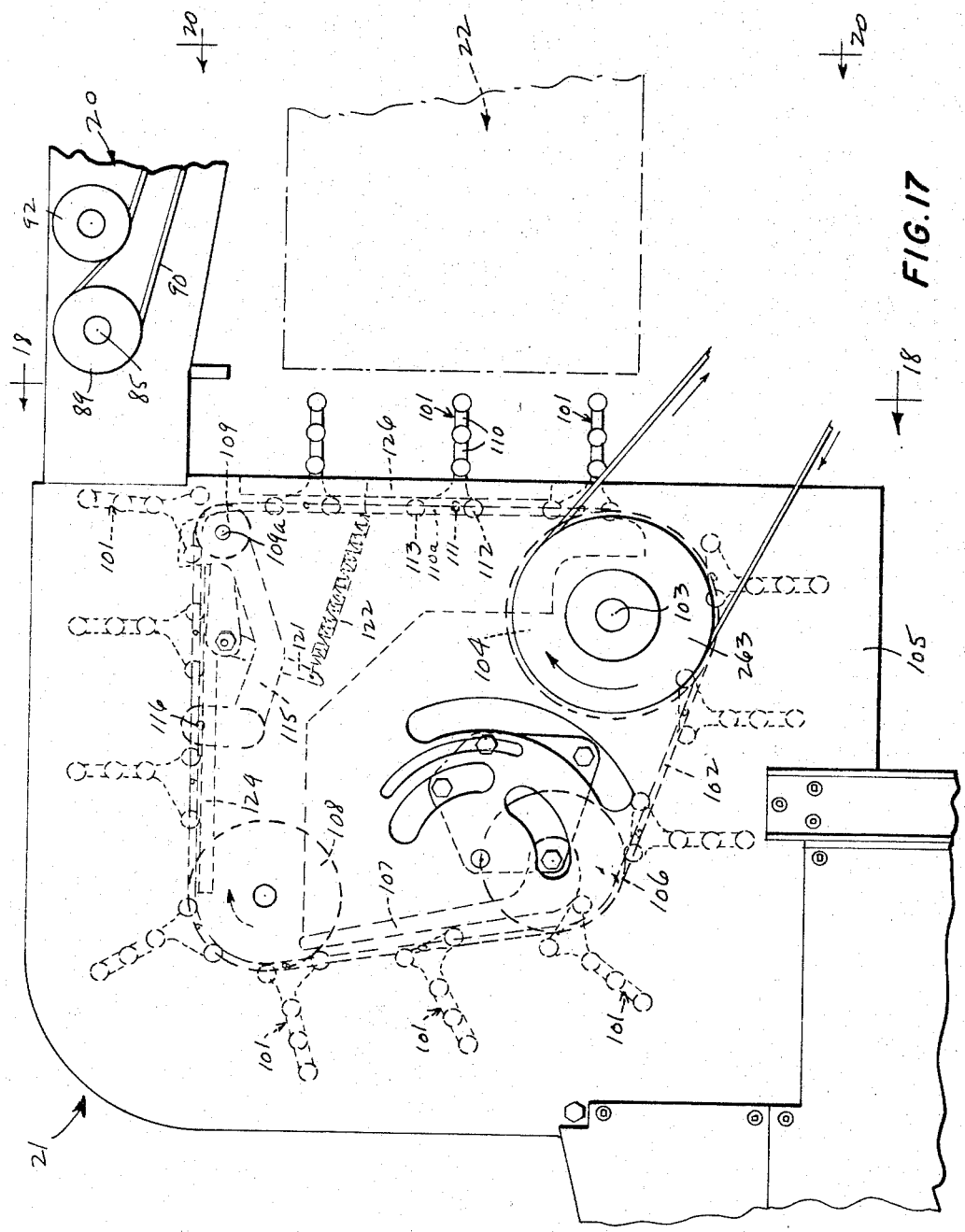

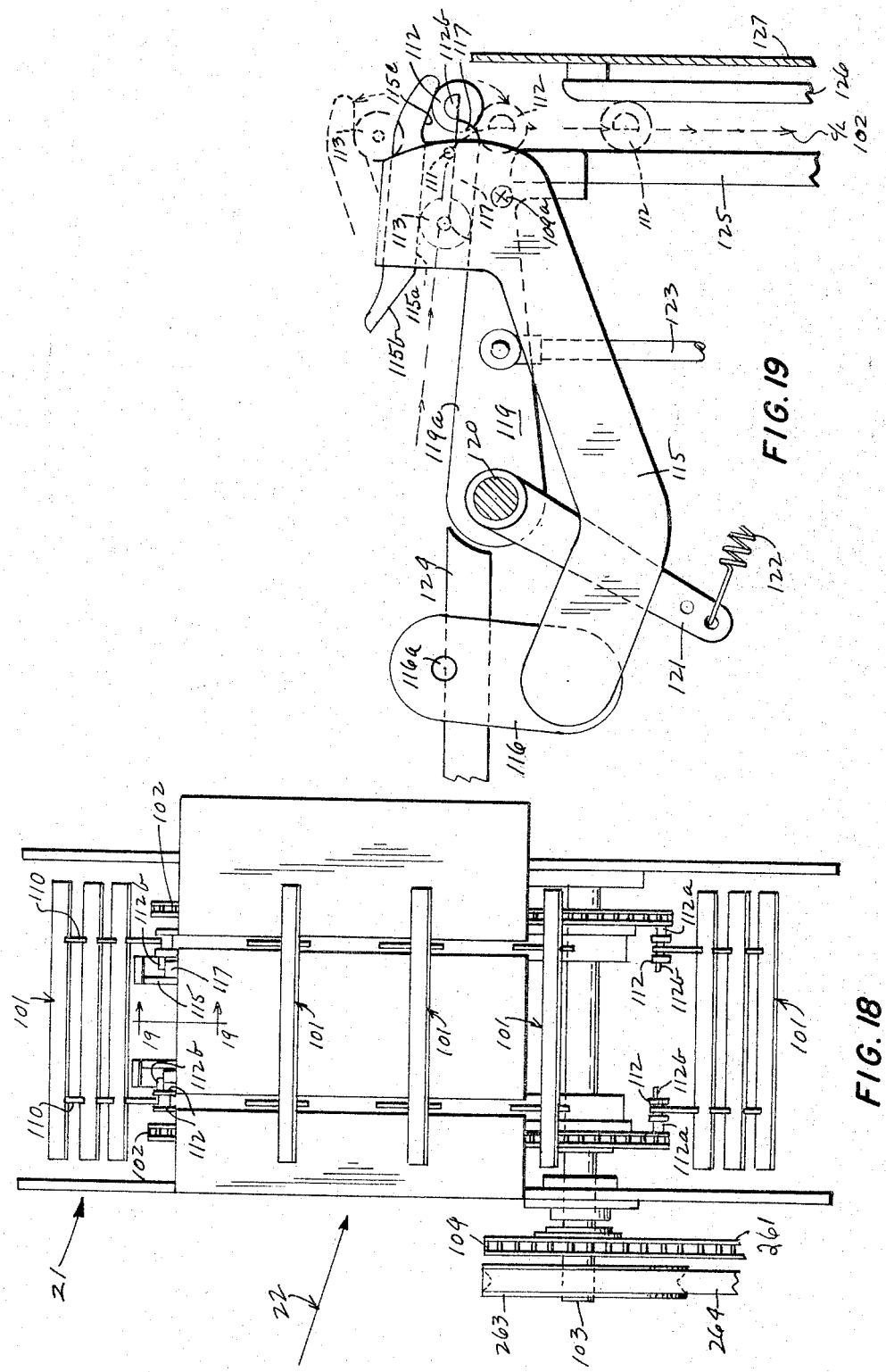

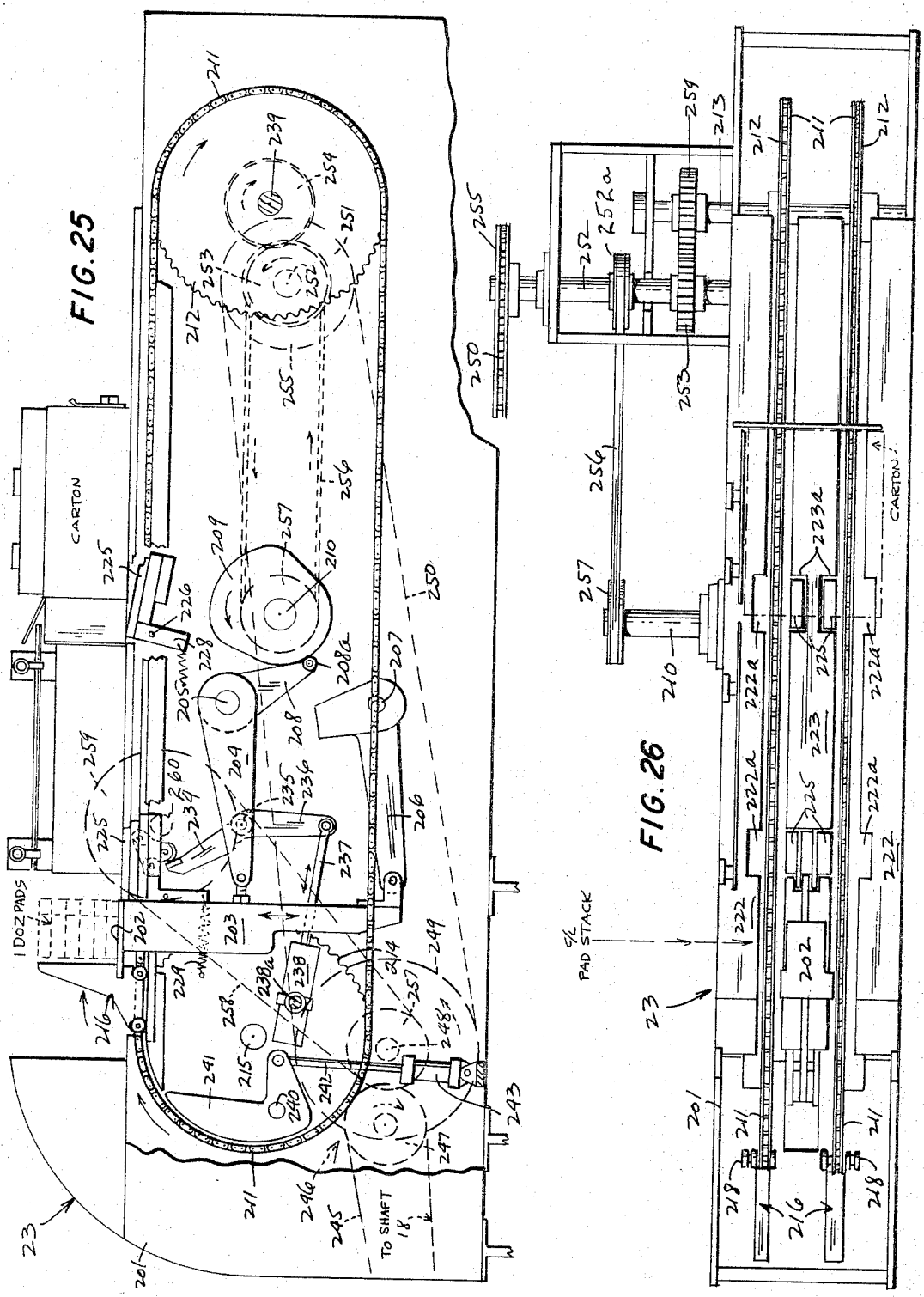

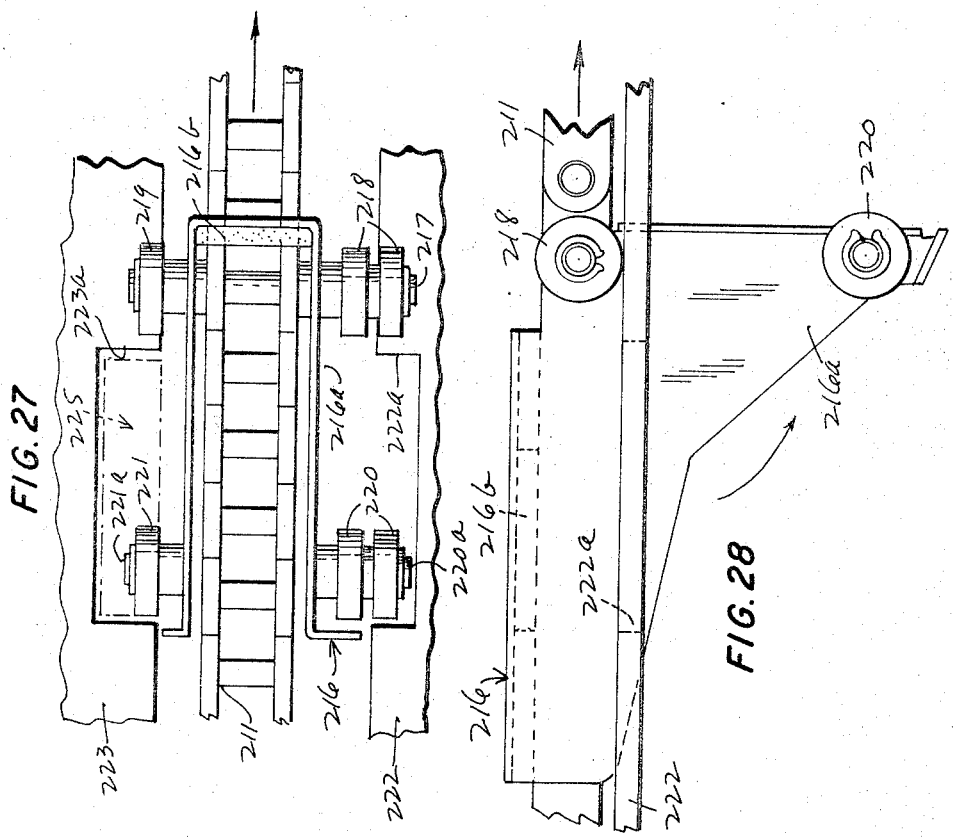

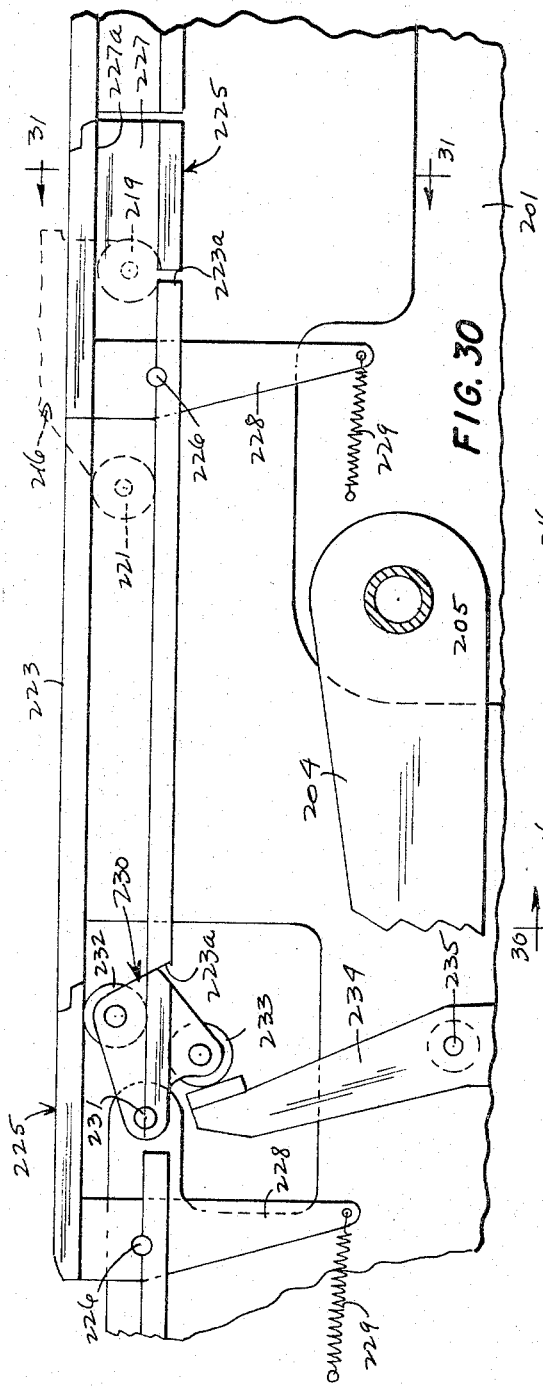

United States Patent Office 3,329,252
Patented July 4, 1967

3,329,252
CELLULOSIC PRODUCT ACCUMULATOR AND
PACKAGER
Richard D. Anderson, Neenah, Wis., assignor to Kimberly-Clark Corporation, Neenah, Wis., a corporation of Delaware
Filed Apr. 21, 1964, Ser. No. 361,455
35 Claims. (Cl. 198—34)

This invention is directed to improvements in apparatus for accumulating and packaging tapered sanitary pads and the like.

Elongated tapered sanitary pads with their end tabs folded over as manufactured by a tapered pad machine are delivered in line, end to end, with their wide ends to wide ends, and narrow ends to narrow ends.

These tapered pads are transferred at an angle from their in line delivery to be accumulated in groups in side by side position so that the end pads in each group have their elongated sides generally parallel to each other with their ends staggered a little but in approximate alignment. These groups are accumulated in stacks and the stacks may be accumulated with one stack above another stack. The accumulated side by side stacks are pushed as an accumulated group of stacks into an open ended carton.

It is an object of the invention to provide apparatus to accumulate tapered sanitary pads in groups, accumulate the groups as stacks and accumulate a number of stacks side by side and move them into a carton.

Another object of the invention is to provide an angle transfer conveyor for transferring pads from an oncoming in line position to a side by side position in groups of pads for an accumulator.

A further object of the invention is to provide a sweep mechanism to remove a stack of pads from a descending vertical accumulator.

A still further object of the invention is to provide conveyor apparatus for accumulating stacks by moving the stacks with flights on the conveyor and cooperating operating mechanism for retracting the flights.

Still further objects and the entire scope of applicability of the present invention will become apparent from the detailed description given hereinafter. It should be understood, however, that the detailed description and specific examples are given by way of illustration only and, while indicating the preferred embodiments, are not given by way of limitation, since various changes and modifications within the spirit and scope of the invention will become apparent to those skilled in the art from this detailed description.

For a more complete understanding of the invention reference is had to the following drawings, the description and the claims that follow.

FIG. 1 is a schematic layout of a tapered pad making machine and accumulator of the tapered pads;

FIG. 2 is a plan view of the tapered pad with the formed end tabs extended;

FIG. 2A is a perspective view of the tapered pad with end tabs folded over ready to be accumulaed and packaged.

FIG. 3 is a side elevation of the pad accumulator mechanism as viewed at the right-hand end of FIG. 1 on an enlarged scale;

FIG. 5 is a top plan view of the transfer mechanism;

FIG. 6 is a side elevation of the transfer mechanism viewed generally along line 6—6 of FIG. 5;

FIG. 7 is a view along line 7—7 of FIG. 5 of a drag link drive mechanism for the transfer mechanism;

FIG. 8 is a time versus velocity graph of the drive of the angle transfer mechanism of a completed pad;

FIG. 9 is a diagrammatic plan view of the accumulator;

FIG. 10 is a fragmentary plan view of the first and second flights of the first accumulator;

FIG. 11 is side elevation of a flight of the first accumulator;

FIG. 12 is a plan view of the first and second accumulator mechanism;

FIG. 13 is a side elevation of the first and second accumulators of FIG. 12 as viewed along line 13—13 of FIG. 5 on an enlarged scale;

FIG. 14 is a section along line 14—14 of FIG. 12 on an enlarged scale;

FIG. 15 is a side elevation of the apparatus in FIG. 14 as viewed from the left-hand side;

FIG. 16 is a fragmentary side elevation of the transfer of pads from first accumulator to second accumulator to accumulate them in a vertical stack;

FIG. 17 is a side elevation of the second accumulator;

FIG. 18 is a front elevation of the second accumulator substantially along line 18—18 of FIG. 17;

FIG. 19 is a sectional elevation along line 19—19 of FIG. 18 on an enlarged scale showing the snap action of the vertical elevator of the second accumulator;

FIG. 25 is a side elevation of the third accumulator as viewed from the right-hand side of FIG. 1 on an enlarged scale;

FIG. 26 is a plan view of the third accumulator in FIG. 25;

FIG. 27 is a fragmentary plan view on an enlarged scale of a portion of the track and a flight on the right-hand chain at the second gap station;

FIG. 28 is a side elevation of FIG. 27 but with a flight pivoted below the bed on which a stack of pads is moved;

FIG. 29 is a side elevation of a flight attached to one chain;

FIG. 30 is an enlarged fragmentary side elevational view of the gap fillers of the track and gap fillers shown in FIG. 25; and FIG. 31 is a fragmentary view of the track and right-hand gap filler along line 31—31 of FIG. 30.

Throughout the description like reference numbers refer to similar parts.

Figure 24:
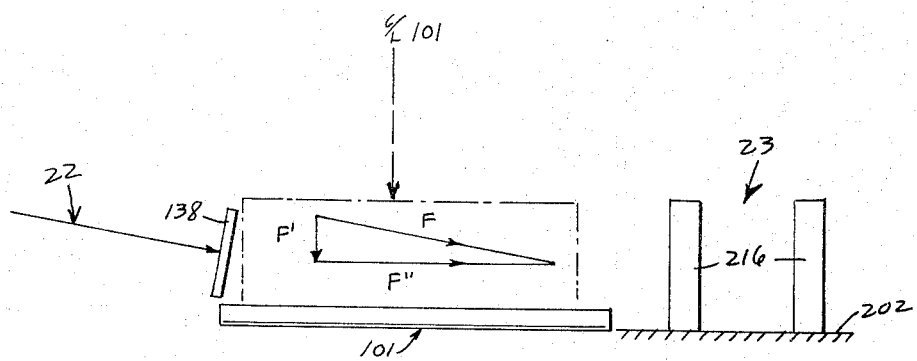
FIG. 24 is a vector diagram of the action of second accumulator and the sweep to move a stack of pads from second accumulator to third accumulator.

FIG. 1 is a diagrammatic plan view of the sanitary pad making machine and angle transfer mechanism of completed pads and outline of the accumulator mechanism which is the subject of this application. An outline of the making of the tapered pad is briefly made for background. It is the subject of a separate application. The wadding is made up of laminations and wrap at 1 and intermittently fed through an intermittent feed conveyor 2 which has associated therewith a corner cutter 3 for the pads to be formed. The intermittent feed 2 feeds the wadding which has the proper corner cuts made therein to a pair of slitters at station 4, each of which cuts at an angle to make the tapered pads. The pads specifically are in the shape of an isosceles trapezohedron as shown in FIG. 24. A continuous running conveyor 5 transports the pads from the slitter in equal spaced relation in a general parallel attitude to each other to the end of the continuous conveyor 5. A transverse pad feed conveyor 6 pulls off each pad individually and transfers it in equal spaced end to end relation to a displacement mechanism 7. This displacement mechanism 7 is necessary to properly space the pads in line with their wider ends closer together and their narrower ends further apart. The sanitary pads are worn by the user with the narrower end which has the longer tab positioned to the back while the wider end with the shorter tab is positioned to the front. The displacement mechanism at station 7 transfers the spaced pads to a wrap and mask applying and folding mechanism 8 where the tapered pads are contained in the tubular web with a uniform cross section equal to the larger end of the pad. After folding the wrap and mask the pads pass with wrap and mask thereon to a former 9 for forming up the loose wrap, thence to calendering station 10, to a tab cutter and front tab folding and tab conveying mechanism 11, thence to a rear tab folding and pad conveying mechanism 12 and finally to an angle transfer mechanism 13 where the completed pads are transferred to accumulators 20, 21, and 23 that are the subject of this application.

In FIG. 1 a main drive motor drives through a drive shaft 14 to a right angle gear box 15. From gear box 15 is driven another drive shaft 16 to a right angle reducer gear box 17 which has an output shaft 18 leading further on therefrom. This output shaft 18 through suitable drive connections, to be described, drives the accumulator mechanism. Driving power for the various mechanisms is taken off from these shafts and gear boxes as necessary.

Since the pads are tapered they are accumulated by twos that are oppositely disposed as shown diagrammatically at the right-hand side of FIG. 1. However, more than two could be accumulated under the same principle.

The finished pads are transferred at an angle by the transfer mechanism 13 to a first accumulator in the zone indicated at 20 and moved by it to a second accumulator 21 that is a vertical elevator to accumulate a stack of two abreast pads. A sweep 22 moves the accumulated stack of pads at 21 to the right and onto a vertically movable table or elevator of a third accumulator 23. The elevator descends and the stack of pads is moved along a bed by flights on the third accumulator 23 and on into a carton that lays on its side, all as will be hereinafter described.

In FIG. 3 there is a diagrammatic vertical side elevational view showing of the accumulators to be described later in detail. As an illustration the elevator of the second accumulator 21 accumulates a stack of one-half dozen pads, these are swept onto the elevator of the third accumulator which descends and accumulates one dozen pads. The third accumulator moves the accumulated one dozen along and accumulates a total of three dozen pads that are pushed along further sideways into a carton. Any number of pads could be collected in a stack by proper arrangement.

*Transfer mechanism to first accumulator*

The pad has been transferred to a transfer mechanism 13 and has been fully fabricated and has its tabs folded over. These tapered pads, as explained heretofore, arrive at the transfer mechanism 13 in line and properly spaced. The small or narrow end of each pad is spaced next to the small end of the next pad the equivalent of two long tab lengths. The larger or wider end of each pad is spaced next to the large end of the next pad the equivalent of two short tabe lengths.

In general this transfer mechanism 13 transfers the pads at about a 37° angle from the approaching line of finished pads, see FIG. 1, to the first accumulator 20.

Figure 4:
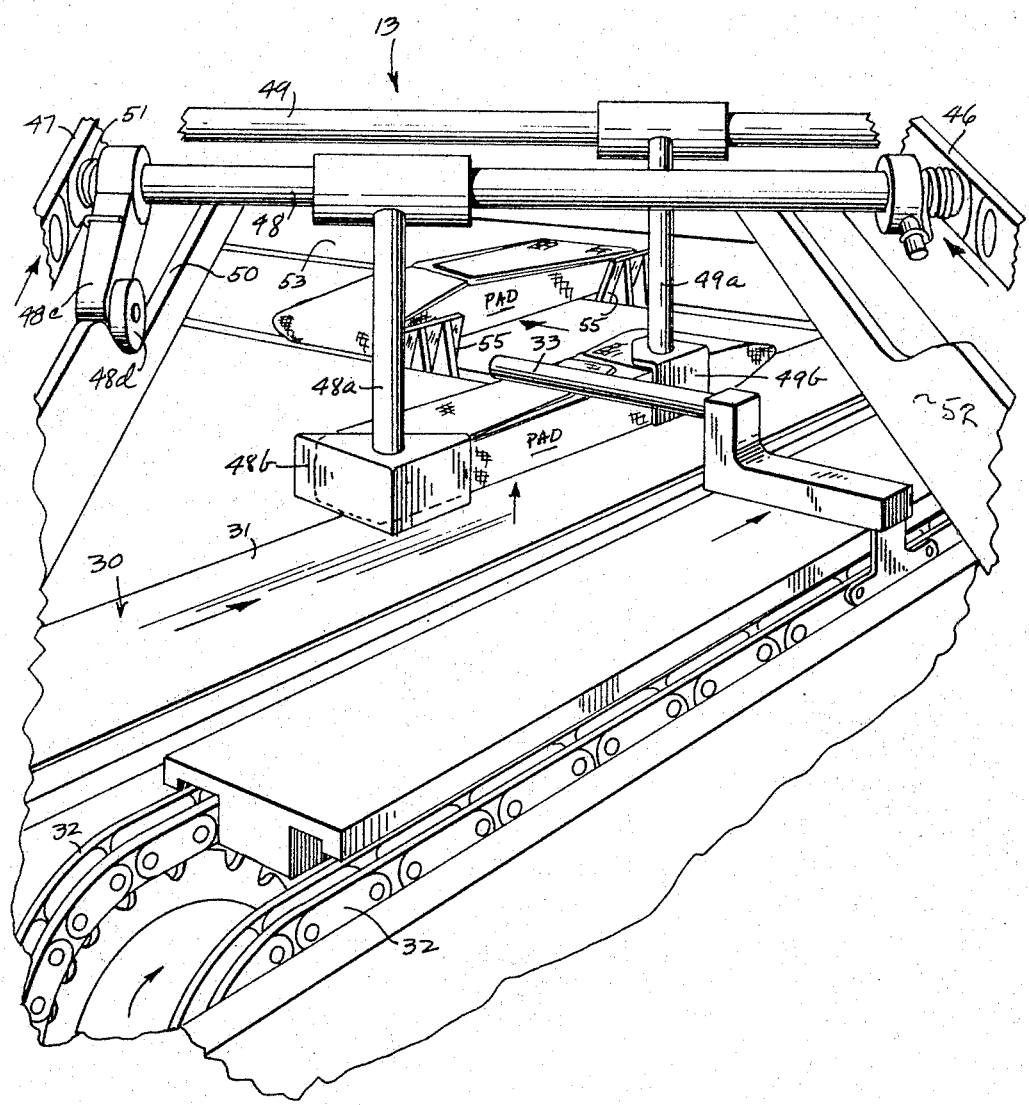
FIG. 4 is a diagrammatic perspective view at the right-hand lower corner of FIG. 1 showing the transfer of the complete pads to a first accumulator where the pads are accumulated by twos.

The pad has been moved up to the transfer mechanism 13, see FIG. 4, on an endless conveyor generally indicated at 30 having a conveyor belt 31. A tab folder 33 has been moved along by an endless conveyor 32 which travels faster than the endless conveyor belt 31 and thus folds the rear tab over the pad.

The transfer mechanism 13 has a pair of spaced apart side plates 35 mounted on the top end of a frame 36, see FIG. 3. Between the plates 35 is an endless chain conveyor 37 which has a drive shaft 38 mounting spaced apart drive sprockets 39. Idler sprocket mounting shafts are indicated at 40 and 41 in a horizontal spaced apart line as shown in FIG. 6 in the lower part of the plates 35. Each of the shafts 40 and 41 has respective idler sprockets 40a and 41a thereon. A pair of take-up sprockets 42 are mounted on a shaft 43 that is supported on arm 44 pivoted on shaft 41. An adjusting screw mechanism for arm 44 is shown at 45.

About the sprockets are trained endless chains 46 and 47. Pivotally mounted between these chains 46 and 47, see FIG. 4, are four pair of spaced cross rods 48 and 49 with each pair spaced in proper position along the chains. Fast to each rod 48 is a depending arm 48a having a flight 48b that has a top and two sides to contact a rear corner of a pad. The cross rod 49 has a like depending attached arm 49a and a flight 49b at its end having a top and a side to engage a side of a pad. The positioning of these flights 48b and 49b will of necessity be altered to take care of the spacing and positioning of the incoming respective pads to be moved by the respective pairs of flights and the positioning of the tapered pads as respects narrow and wider ends.

At the far end of rod 48, see FIGS. 4 and 6, is attached a cam arm 48c having a cam follower roller 48d on its end. This cam follower 48d rides on a cam track 50. A tension spring 51 on rod 48 presses arm 48c to hold its cam follower 48d against its cam track 50.

In FIG. 6 a cam arm 49c depends from rod 49 and has a cam follower 49d on its end which rides on a right-hand track 52, see FIG. 4.

The cam tracks 50 and 52 raise and lower the respective flights 48b and 49b so as to contact an oncoming pad and transfer it, see FIG. 5, off of conveyor belt 31 at an angle of about 37° until its leading end rests against a fence. In FIG. 5 there is also shown a pair of elongated guard plates 54 for the cam arms attached by brackets 54a to the side plates 35. The successive positions of two pads as moved by the transfer mechanism 13 are shown in FIG. 5. It will be noted that the pads arrive at the fence 53 with their axes at 90° to the fence 53.

The variable speed drive of the drive shaft 38 of the transfer mechanism 13 is shown in FIG. 7 as a drag link mechanism 60. The drive of this mechanism 60 is from the secondary drive shaft 18. Shaft 18 has a pulley 61 which drives a belt 62 leading over a pulley 64 on a right angle reducer generally indicated at 63 whose output shaft is indicated at 65 in FIG. 7. This driving shaft 65 has a crank arm 66 secured thereto. At the end of arm 66 is pivotally connected a drag link 67. This drag link 67 is pivotally connected to the outer end of an arm 68 which is clamped to shaft 38 to drive the same. The shaft 65 drives at constant speed and through the drag link arrangement the shaft 38 is driven at a variable speed as shown illustratively in the graph in FIG. 8. The normal rate of drive of shaft 38 is velocity at A in FIG. 8. The velocity increases to a velocity B and then decreases as indicated by the graph back to velocity A. The shaft 38 rotates more than 180° in its change of speed from maximum B to normal speed A and this timewise is greater than the time for the shaft to increase from normal velocity A to maximum velocity B. The speed increase of shaft 38 from A to B is to move the flights 48b and 49b and the pad contacted thereby at maximum velocity, which component is equal to the velocity of the oncoming pad travel on belt 31. It is important to remove the pads from the belt in a smooth but expeditious fashion. In the vector diagram shown in FIG. 5, P equals the pad velocity on belt 31, F equals the velocity of the flights 48b and 49b on contacting a pad, and S equals the side movement velocity of the pad. The component of F in the direction of pad movement on the belt is equivalent to pad velocity P at the time the flights contact the pad.

First accumulator

In FIG. 4 the transfer conveyor 13 moves the pads to a position where their leading end is against the fence 53 with their longitudinal axis perpendicular to the fence.

A first pair of flights 55 are shown in FIG. 9 and they are mounted on spaced apart conveyor chains 70 in an offset manner. These flights protrude above a horizontal bed area 71 and move the pad A along so that its leading edge is perpendicular to the fence 53. These flights 55 retract and leave the pad at second position as more fully described hereinafter. Another pad B is moved into contact with the fence 53 by the transfer conveyor 13 and a second set of flights 56 carried by chains 70 moves pad B along. The flights 56 are arranged abreast and their leading edges are perpendicular to the fence 53 so that they orient pad B with its trailing edge perpendicular to the fence. The flights 56 move the pad B into contact with pad A and continue to move the two pads A and B together into a pair of U-shaped grippers 82.

The first accumulator 20 has a framework 72, see FIGS. 12 and 13, and is driven from a pulley 73 on a shaft 74 mounted in the lower part of framework 72. A belt 75 leading from drive shaft 18, see FIG. 3, drives pulley 74. Shaft 74 carries two spaced drive sprockets 76 to drive endless conveyor chains 70.

The flights as shown for the second set 56 in FIG. 11 are attached at their leading portion to chain 70 and have cam followers 55a and 56a respectively at their rear portions. The cam follower 55a of each of the first flight members 55 cooperates with a cam track portion 77 to rotate the flight 55 so as not to project up above the bed 71 at station 78. The second set of flights 56 have cam followers 56a that are spaced in as respects the spacing of followers 55a on the first flights shown in FIG. 10 and cooperate with cam tracks 78 further down the first accumulator path and retract.

In FIG. 12 there are shown inner tracks *a* spaced inside of the chains 70 and outer tracks *b* spaced outside the chains 70 for guiding the rollers of the flights 55 and 56. The pads being moved by the flights 55 and 56 ride between spaced rods 81, three above and three below, see FIG. 14, to station 80 where is located the cam tracks 78 to retract the second set of flights 56.

The guide rod 81a catches any disarranged tab and folds it over the pad. The second flights 56 push the pads A and B into a U-shaped carrier 82. These carriers 82 are mounted on a second pair of chains 83a on a conveyor, generally indicated at 83. The U-shaped in cross section, carriers 82 have an upper member 82a and a lower spring member 82b. The spring members 82b are connected together by a rod follower 82c, which rides on the middle lower guide rod 81 so as to hold the spring portion 82c open to receive the pads. The pads are carried along in the carrier 82 to where the rod 81 terminates, see FIG. 15, and there the follower 82c permits the spring portion 82b to grasp the pads. This occurs after the second flights 56 have reached their end of pushing the pads at station 80.

In FIG. 16 the carriers 82 have capsized their carried pads and as the chains 83a move back under the table the pads hit strippers 84 at the end of the pads and outside of the path of the carrier 82. These strippers deposit the pads on a vertical elevator 101 of the second accumulator 21.

The conveyor chains 83a are carried on sprockets 86 on drive shaft 85 and idler sprockets 88 on idler shaft 87. Drive shaft 87 has a drive pulley 89 which is driven by a belt 90 leading over pulley 91 on drive shaft 74. An idler pulley 92 is provided for the belt 91.

Second accumulator

The second accumulator 21 receives the pads by twos from the first accumulator 20 on elevator flights 101 and, as an example, the accumulation on 101 is three pads high. Arrangements could be made for any number of pads high.

The second accumulator 21 has a pair of endless chains 102 trained over drive sprockets 104 on drive shaft 103 suitably mounted in framework 105. The chains travel over idler sprockets upwardly over an area of a cam track 107 to idler pulley 108, then horizontally to and over a sprocket 109 which has a pivot point at 109a, see FIG. 19, and thence vertically downward back to pulley 104. Attached in spaced relation between chains 102 are flights 101 which are moved into position in timed relation to receive a stack of pads from the conveyor 83 previously described.

The main function of this vertical second accumulation is to accumulate a stack of pads and move the stack vertically downward to be swept off to the third accumulator 23.

An important feature in the second accumulator 21 is to bring the flights 101 into position about pivot 109a by a snap action. Each of the flights 101, see FIGS. 17 and 18, has a pair of spaced arms 110 having a transverse base 110a that is attached to the inside of the chains 102 by pins 111. The transverse base portions 110a have a pair of leading cam followers 112 and a pair of trailing cam followers 113 mounted on pins 112a and 112a. On the inside ends of the pins 112a of the leading cam followers is a semicircular sear 112b.

In FIG. 19 there is a first pair of arms 115 which are rigid with a rear portion 116 that is pivoted at 116a. The forepart of each arm carries a fixed elongated sear 117, an upper track 115a with an upwardly trailing portion 115b and a recessed upwardly forward portion 115c. The arms 115 are oppositely disposed and the arm 115 shown in FIG. 19 is the right-hand arm in FIG. 18. A second pair of L-shaped arms 119 are pivotally mounted on a shaft 120 that has a depending arm 121 fixed thereto that is held biased by a spring 122. Arm 119 has a track 119a on its upper surface and this is termed a swing track 119a. A snubber 123 is attached to the swing track 119a. The swing track acts on the outside tracking cam followers 113. The arms 115, see FIG. 18, are mounted inside the path of travel of the arms 110 so that the sear 112b on the front set of cam rollers cooperates with the fixed sear 117 on the arm 115.

A fixed track 124 is shown in FIGS. 17 and 19 for the cam followers 112 and 113 to ride on.

The flights 101 approach on the upper horizontal run of the fixed tracks 124 and enter onto the swing tracks 119a. The leading cam followers 112, restrained by the chains 102, enter the portion 115a of upper track 115 and progress onto the upper track portion 115a where this upper track 115a holds the sear 112b against fixed sear 117. As the flight progresses and the leading follower 113 reaches the upper track upwardly extending recess portion 115c, the follower 113 is free and the sear 113b is riding on the fixed sear 117 because the the trailing followers 113 are riding against the upper track 115a as it is pushed up by the swing track 119a through the action of arm 121 and spring 122. The flights are restrained in their movement by the chain 102 and as the flight progresses and the sear 112b reaches the end engagement with sear 117, the spring 122 takes over, and the snap pivotal action of the flight 101 takes place to snap the flight around the pivotal mounting 111. As the flight 101 moves down vertically it is guided by the cam track 125 and the cam track 126 mounted on vertical plate 127.

As the flights 101 move down they pick up pads from conveyor 82 previously described, see FIG. 16. As the flights progress around sprockets 104 and 106 their trailing followers 113 ride against cam track 107 to erect the followers.

Sweep assembly

The sweep assembly 22 is used to move an accumulated stack of pads from vertical flight 101 onto an elevator table 202, see FIGS. 24 and 25. In FIG. 24 there is shown a vector diagram of the velocities of sweep and flight 101. The sweep 22 operates on an angle to the horizontal and its velocity is F and the vertical component is F' which is equal to the downward speed of the flight 101. The vector F" in the horizontal direction is the resultant component of speed with which the accumulated stack of pads on 101 is moved off onto the elevator table 202 of the third accumulator 23.

The sweep 22 has a pair of spaced mounting plates 130 and 130 held apart by spacers 132. A pair of endless chains 133 ride over drive sprocket 134 on drive shaft 135. There are idler sprockets 136 and 137 over which the chains also travel. The run between sprockets 136 and 137 is where the sweeping takes place. A sweep plate 138 is mounted on a pair of spaced arms 140. The arms 140 are mounted on a shaft 141 pivotally attached between chains 133. Shaft 141 pivotally seats on a castor assembly 141a at its lower end riding on a track 141b on end plate 130. Shaft 141 has two spaced apart arms 142 and 143 rigidly attached thereto, each having its respective cam follower 142a and 143a. The shaft 141 that is pivotally mounted at top and bottom has a coil spring 146 attached to it and to its chain to bias the shaft to rotate the sweep 138 clockwise as viewed in FIG. 22. As the sweep 138 progresses to move a stack of pads, the cam 142a rides in a cam track 145 extending for the run of chain 133 between pulleys 136 and 137 while the cam follower 143a on arm 143 is free.

Figure 22:
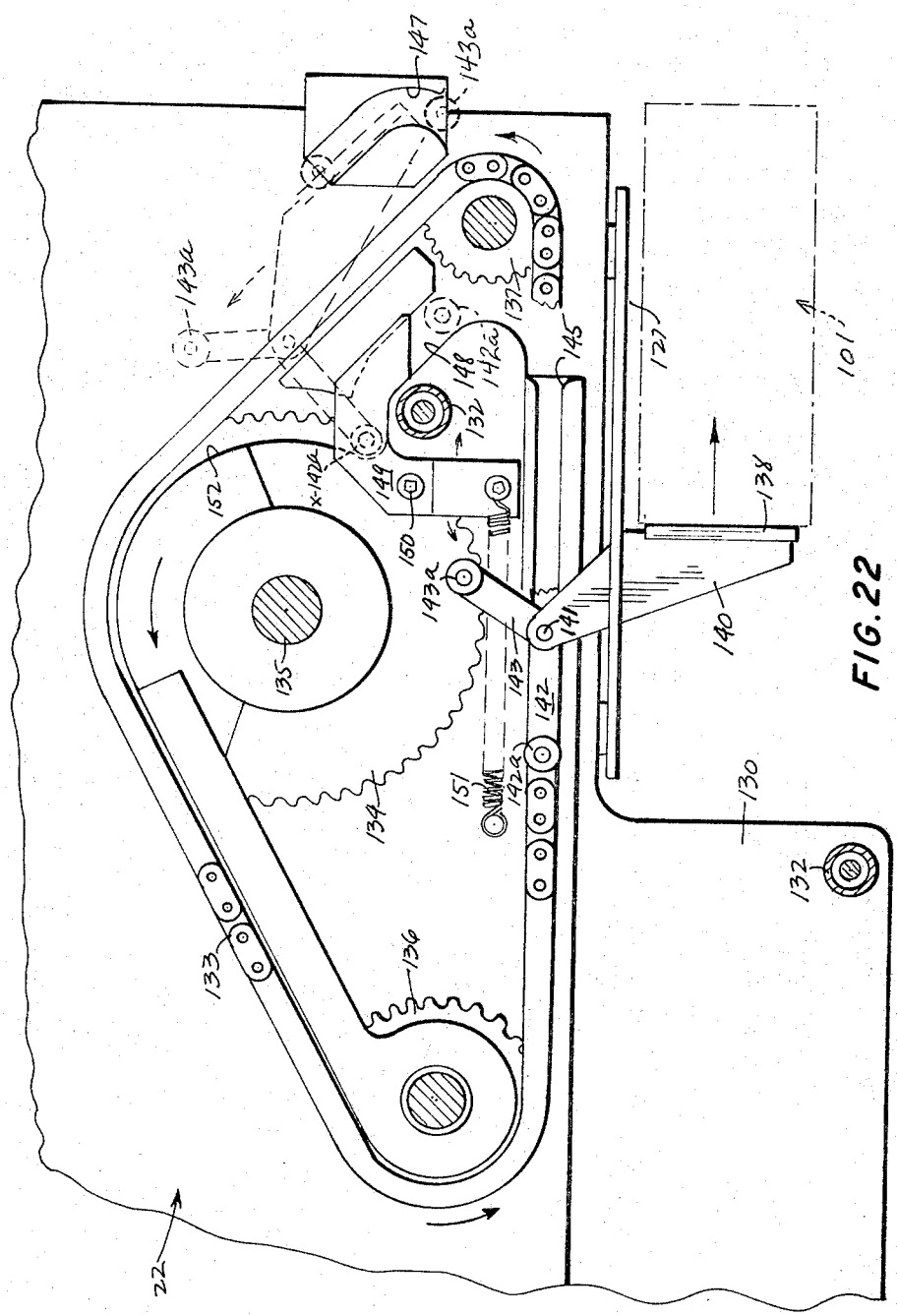
FIG. 22 is a bottom plan view of the sweep along line 22—22 in FIG. 20.
Figure 23:
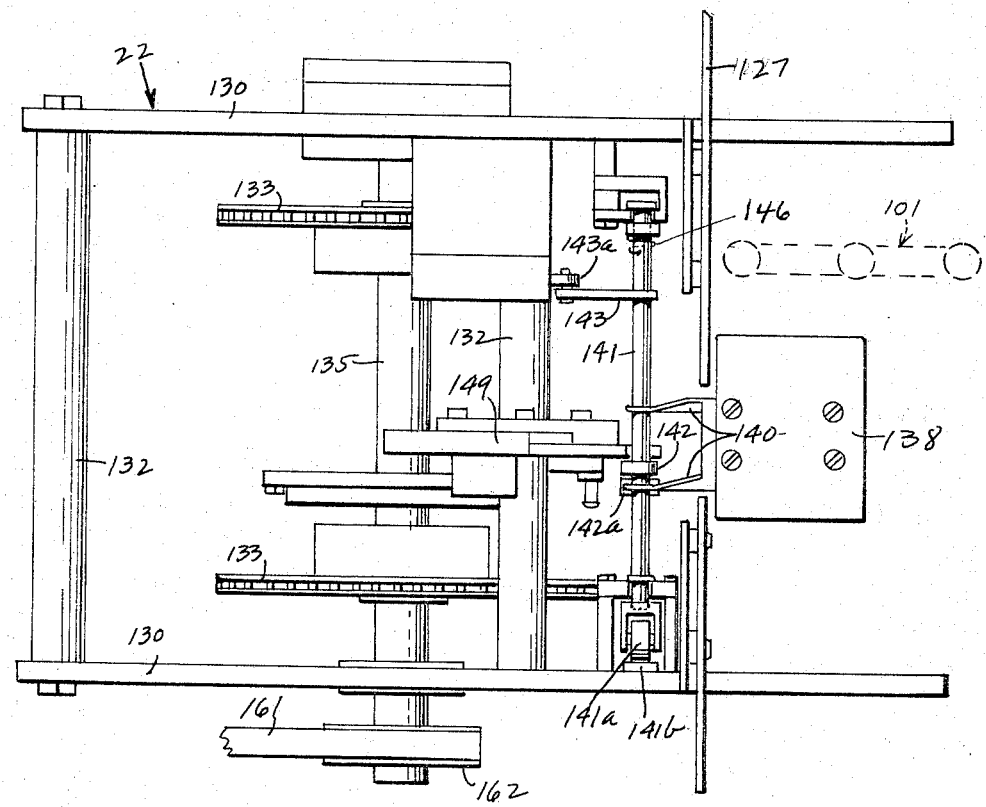
FIG. 23 is an elevational view of the sweep as viewed at the right-hand end of FIG. 20 along line 23—23 on an enlarged scale.

As the cam follower 142a, see FIG. 22, reaches the idler sprocket 137 and leaves the cam track 145, the shaft 141 rotates counterclockwise under the influence of the biasing 146, see FIG. 23, the leading cam follower 143a enters a cam track 147 and permits the sweep 138 to be translated with mounting shaft 141, which is pivotally, mounted, as it recedes from the area of the flights 101 of the second accumulator 21.

As the cam follower 143a leaves its cam track 147, the trailing cam follower 142a rides in a cam track 148. The cam follower 142a, as it proceeds in the cam track 148, rides against a C-shaped pivoted member 149, pivoted at 150, which is held by a spring 151 so that as the cam follower 142a leaves its cam track 148 it returns to its original position as it follows about an arcuate cam plate 152 whose center is at the center of drive sprocket 134. The purpose of this pivoted member 149 is to insure that the cam follower 142a moves into position marked X–142a after leaving its cam track 148 so that the follower 142a will trail behind the pivoted mounting shaft 141 in its return to re-enter cam track 145.

Figure 20:
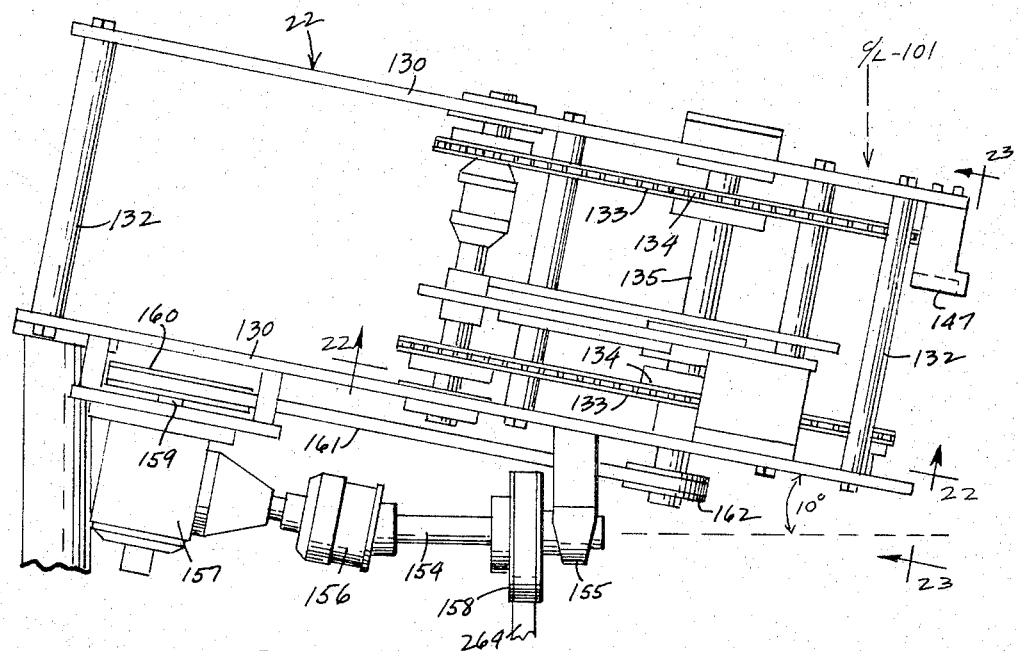
FIG. 20 is an elevational view of a sweep that moves pads from second to third accumulator as it would appear along line 20—20 of FIG. 17.
Figure 21:
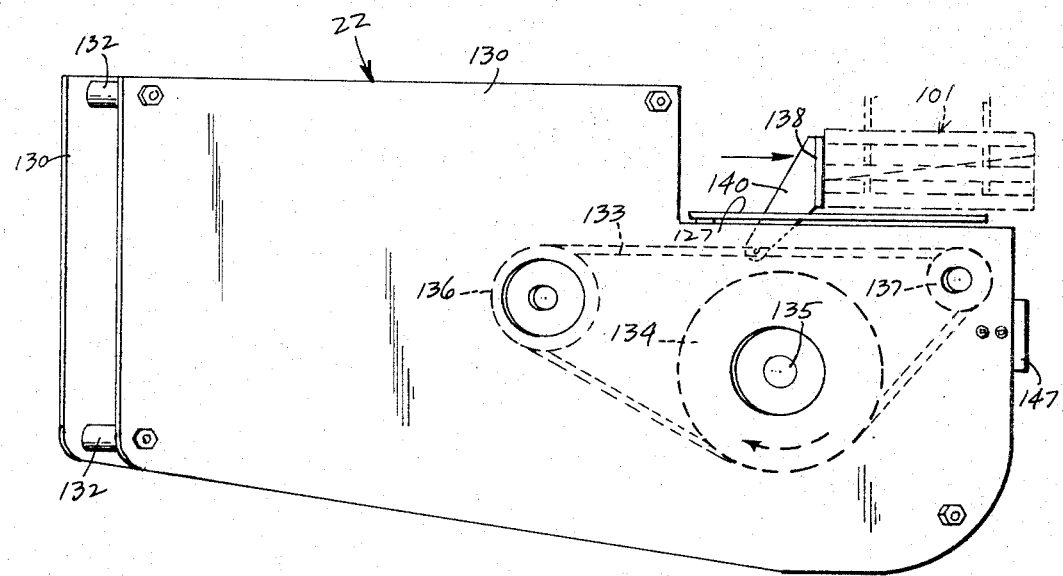
FIG. 21 is a top plan view of the sweep in FIG. 20.

The drive for the sweep 22 is shown in FIG. 20. A shaft 154 supported at one end in bearing support 155 connects through a universal coupling 156 that is connected to drive a right angle gear box 157. Shaft 154 has a pulley 158 driven by a belt from the first accumulator 20. An output shaft 159 on gear box 157 has a pulley over which is led a belt 161 to a drive pulley 162 on the drive shaft 135 of the sweep.

Third accumulator

The third accumulator 23 is shown in FIGS. 25 and 26. This accumulator receives the pads from the second accumulator 21 as pushed onto an elevator or movable table in the third accumulator. On the third accumulator the stack of pads, for example, six high making one dozen, is moved along by flights 216 on a horizontal table to accumulate three dozen, as illustrated, and these are pushed into a carton that is laying on its side to receive the three stacks.

The third accumulator 23 has a generally horizontally disposed framework 201 in which the various mechanisms are mounted. An elevator on table 202 is supported on a depending member 203 that is guided in the framework 201. The vertical elevator member 203 is pivotally supported towards its upper end on an upper pair of arms 204 fixed to a cross shaft 205. A lower pair of support arms 206 pivoted on a cross shaft 207 pivotally support the lower end of member 203. An arm 208 fixed to cross shaft 205 has a cam follower 208a on its end for action by a cam 209 mounted on shaft 210 which makes one revolution per each stack of pads produced on table 202.

A pair of spaced apart chains 211 are trained over a pair of drive sprockets 212 on a drive shaft 213 mounted in one end of framework 201 and a pair of idler sprockets 214 on an idler shaft 215 mounted in the other end of the framework. The chains are spaced to clear each side of the movable table 202, see FIG. 26, and move along suitable supports in the top bed area of the framework 201. On the chains 211 are carried flights 216, one pair illustrated, see FIGS. 27–29. The flights 216 are for the right-hand chain 211 as viewed in the direction of travel. The flights 216 have a U-shaped bracket, see FIG. 27, portion 216a, and a front pivot pin 217 that pivotally connects the flight to the chain. The legs of the U-shaped bracket 216a straddle the chain as they extend rearward. The pivot pin 217 has a pair of right front rollers 218 as viewed in the direction of travel indicated, a front left roller 219, a pair of rear right rollers 220 and a rear left roller 221. Each rear roller is mounted on a pivot pin 220a and 221a respectively, attached to the respective legs of the U-shaped bracket. The front and rear right outer rollers 218 and 220 run on a right-hand track 222 and the left-hand roller 219 and 221 which are in alignment run on the fixed center track 223. An elongated gap 222a is shown in the right-hand track 222 and an elongated gap 223a is provided in track 223 opposite from gap 223a. The showing, as stated above, in FIGS. 27–29 is for the flight and track for the right-hand chain 211. A gap filler, to be described, is provided for gap 223a so that if it fills gap 223a, the rear roller 221 will be supported and the flight 216 will continue erect, as in FIG. 29, but if the gap filler is not present in gap 223a, the rear roller 221 will drop through gap 223a as well as the rear right rollers 220 through their gap 222a and the flight will pivot backwards about the front pivot pin 217 and drop below the chain 211. The left-hand chain 211 will have the pairs of rollers 218 and 220 on their outside track and the single rollers 219 and 221 will be on their inside track. The gaps to be filled by a gap filler 225 will thus be inside gaps adjacent each other and only one unitary gap filler with a single operation is necessary, see FIG. 26 left-hand gap, for both inside gaps. The flight 216 is provided with a sponge rubber 216b on the inside of the bight to act as a bumper when the flight pivots backwards and hits the top of chain 211 as shown in FIG. 28.

A gap filler is generally indicated at 225. These gap fillers are substantially alike for the inside gaps 223a of the right and left chains 211. The filler is pivoted at 226. It has a top portion within which is a U-shaped in-cross section track 227, see FIG. 31, that is open at the side to receive therein the leading rollers 219 and the trailing roller 221 on one side as they pass therethrough. The filler has a depending arm 228 that has an attached biasing spring 229 to pivot the track to downward position about pivot 226. Thus, when the leading inside roller 219 of a flight enters the pivoted end of the track position 227 of the filler, it presses against the upper surface of the U-shaped track 227a, see FIG. 31, and causes the gap filler 225 to pivot counter-clockwise, see FIGS. 25 and 30, about its pivot so that the leading roll 219 passes on through to the further fixed track portion 223, see also FIG. 27. The trailing inside roller 221 is in the U-shaped track portion 227 of the gap filler and the spring 229 pivots the gap filler 225 downwardly and clockwise thereby tipping the flight 216 backward as in FIG. 28 to be in line with the top of the chain 211. The flight 216 is thus carried on by its chain 211 in a backward tipped attitude.

In FIG. 30, the gap filler adjacent the entry end of the track 223 at the left-hand end is under the control of a pivoted mechanism 230 that is a triangular framework and has a pivot 231 below the gap filler 225, and a roller 232 to press against the track portion 227 to hold it upward in gap filling position against the action of spring 229. The mechanism 230 also has a depending roller 233 that is under the control of an arm 234 which is fixed to a pivot shaft 235 from which depends a fixed arm 236. The arm 236 has a piston rod 237 pivotally attached that extends from a pneumatic operating cylinder 238 pivotally mounted at 238a. The pneumatic cylinder is under control of sensing means that detects the presence of a desired number of stacks of pads. Thus, when the last stack of pads arrives on table 202 of a group that is to be pushed into the carton, the sensing means actuates the pneumatic cylinder causing the mechanism 230 to pivot the gap filler 225 into a gap closing condition against the action of the spring 229. The approaching flight 216 is caused to stay erect and push the whole accumulation of stacks into the carton.

When the erect flight 216, just mentioned above, comes to the second gap on down the track 223, its front roller 219 enters the track 227 of gap filler 225 and raises the gap filler. The leading roller 219 moves on out of the track 227 into the fixed U-shaped in cross section track 223, see FIGS. 27 and 31, and the trailing inside roller 221 is in track 227 and urged downward by the action of opening 229 of the gap filler. The flight 216 is tilted backward to the position shown in FIG. 28 as the complete group of stacks of pads has been pushed into the carton to fill the same.

The gap filler 225 shown in position in FIG. 26 has two unitary portions as described above and only the one operating mechanism 230 is necessary to hold the gap filler in gap closed position against the pull of its spring 229 to permit a flight to pass by in erect pushing position.

In FIG. 25, an arcuate member 241 is pivoted at 240 and carries a U-shaped cam track similar to the track 27 of the gap filler. A piston rod 242 is pivotally attached and leads to a pneumatic cylinder 243. When a defective stack is received on table 202, the operator can actuate the pneumatic cylinder 243 to pivot the approaching flight 216 backward so that it will not be in erect position as it approaches the table 202.

*Drive mechanism for third accumulator and its table*

A belt 245, see FIGS. 3 and 25, is driven by a pulley on drive shaft 18 which turns one revolution per pad and drives an input pulley 247 of a speed reducer generally indicated at 246. On output shaft of the speed reducer 246 there is an output pulley 249 that drives a belt 250 which passes over a pulley 255 on shaft 252. The shaft 252 has a gear 253 thereon which meshes with and drives a gear 254 fast on shaft 213 to drive the chains 211.

A pulley 252a driven by shaft 252 drives a belt 256 that drives a pulley 257 fast on shaft 210.

A second pulley 257 on shaft 248 of reduction gear 246, see FIG. 25, drives a belt 258 that passes over a pulley 259 on a cross shaft 260. This shaft 260 has a sprocket thereon (not shown) which drives a chain 261, see FIG. 18, leading over the sprocket 104 that drives shaft 103 of the second accumulator 21. A pulley 263 on shaft 103 drives a belt 264 that passes over drive pulley 158, see FIG. 20, to drive the sweep 22.

I claim as my invention:

1. An apparatus for accumulating and packaging into a carton sanitary tapered pads of approximate isosceles trapezohedron shape comprising, in combination means for conveying said pads in spaced end to end relationship with wide ends to wide ends and short ends to short ends in line; angle transfer conveyor means at the discharge of said in line conveying means and having a fence positioned normal to the line of travel of said pads in said in line conveying means for transfer of pads to said fence with their axes normal to the fence with successive pads oppositely disposed; a third conveyor means for accumulating two oppositely disposed pads with two of the non-parallel sides abutting each other and the ends approximately adjacent each other whereby the other two sides are positioned parallel to each other; a fourth conveyor means adjacent said third conveyor means having pad grasping means for grasping said two accumulated pads and having a capsizing means for capsizing said two accumulated pads and stripping means for stripping said pads from said grasping means; a fifth conveyor means adjacent said fourth conveyor means and its stripping means for receiving said stripped pads from said grasping means, said fifth conveyor means having descending flights for receiving in timed relation and accumulating thereon a plurality of sets of said two abutting pads as a stack of pads; a table means adjacent said fifth conveyor for receiving a stack of pads therefrom; a sweep means positioned adjacent said fifth conveyor means and said table means for contacting and moving said accumulated stack of pads from said stack supporting flight onto said table means simultaneous while the accumulated stack of pads is descending; a sixth conveyor means adjacent said table means for accumulating stacks of pads and having pivotally movable flight means thereon for moving said stacks from said table means; a first means for retracting said last-mentioned flights positioned adjacent said table in the direction of flow of said stacks whereby a number of stacks of pads are accumulated to be pushed into a carton at a carton filling station, means for periodically stopping said first retracting means for retracting said flights whereby the flights are left erect to push said accumulated stack of pads into the carton, a second means for retracting said flights at said carton filling station to retract any erect flights after they have pushed the accumulated stacks of pads into said carton and means for erecting said flights of the sixth conveyor as they return to move another stack of pads from said table.

2. Sanitary pad accumulating apparatus according to claim 1 wherein said angle transfer conveyor means comprises an endless conveyor having a bottom run above said pads, depending pad engaging means carried in spaced relation by said conveyor, means for lowering said engaging means into transferring contact with oncoming pad, means to retract said engaging means as the pad is transferred to abut endwise said fence and variable speed drive means for said conveyor to afford a velocity component at time of pad contact equal to speed of oncoming conveyor and pad, increasing the speed during removal of said pad from said first conveying means and decreasing the speed of pad travel for abutting said fence.

3. Sanitary pad accumulating apparatus according to claim 2 wherein said variable speed drive means for the angle transfer conveyor means is a drag link drive.

4. Sanitary pad accumulating apparatus according to claim 1 wherein said third conveyor that accumulates two oppositely disposed pads has a first flight having trailing edge of pad contacting means disposed at an angle to the longitudinal axis of the third conveyor for contacting and moving a pad whose wider end abuts the fence into a position along said conveyor with the leading edge of the pad normal to the longitudinal axis of the conveyor, means for retracting said last-mentioned first flight, a second flight having trailing edge of pad contact means disposed normal to the longitudinal axis of said third conveyor and moving a next pad whose narrow end abuts the fence into abutting contact with said first pad and moving the two accumulated pads into said grasping means and means for retracting said second flight at a position on said third conveyor to retract the flight after moving said abutting pads into said grasping means.

5. Sanitary pad accumulating apparatus according to claim 4 wherein said flights are L-shaped members with the leading end of leg of the L being pivotally attached to said third conveyor and the trailing end of the leg having a cam follower extending transversely therefrom and said retracting means for the flight is a cam track receiving said cam follower.

6. Apparatus according to claim 1 wherein said third conveyor means includes a bottom of pad engaging longitudinal rod terminating at one end adjacent the entry end of the fourth conveyor and wherein said pad grasping means is a bracket attached to said third conveyor having a leading edge of pad engaging upstanding member, a longitudinal rearwardly extending top of pad engaging member extending from said leading edge engaging member, a leaf spring member for guiding and engaging the bottom of said pads and a transverse member on said spring member for engagement underneath said bottom rod to hold down said spring member as said pads are received between said top member and spring member, said transverse portion on the spring member on leaving said terminal end on said rod allowing release of the spring member and the grasping of said pads.

7. An apparatus according to claim 1 wherein said flights on the fifth conveyor means have pivot means mounting them on an endless conveyor of the conveyor means, said conveyor having a horizontal run moving into a vertical descending run and means along the top run of the conveyor for pivoting the flights from the terminus of their horizontal run on the conveyor in an instantaneous snap action manner to avoid interference with said grasping means on the fourth conveyor.

8. Apparatus according to claim 1 wherein said fifth conveyor has an endless conveyor with a top horizontal run, a vertical run adjacent said capsizing means and stripping means for the pads by the fourth conveyor and a return run, said flights on the conveyor being T-like in shape with cap of T being pivoted to the conveyor, the leg of the T projecting out from the conveyor and under the grasping means to receive the stripped pads, the cap of the T at its ends having a leading and a trailing roller extending transversely therefrom with the leading roller having an axle with a sear at one end, a fixed track for the rollers along the top run of the conveyor, a swing track for the rollers between fixed track and the vertical run of the conveyor over which the rollers ride, said moving track being pivoted adjacent the end of the fixed track from which the rollers approach, spring means attached to the swing track tending to move it upward, an arm pivoted adjacent the swing track pivot in the direction from which the flights approach and having its extending end adjacent the top of the vertical run of the conveyor where the flights thereon receive the pads in a stack, said extending end of tthe arm having a top track with an upwardly extending recess in its end extending over the vertical run of the conveyor for engaging the tops of the trailing rollers and an elongated sear spaced therebelow for cooperation with said other sear and parallel to the top track, overlapping the vertical run of the conveyor a lesser amount than the top track, said conveyor restraining the outward movement of the rollers and as said sear on the leading roller pivot slides off said elongated sear on the arm, said biased swing track causes the flight to instantaneously pivot about its mounting in a snap-like action to bring the flight into stack receiving position without interference with the immediately preceding pad conveyor.

9. Apparatus according to claim 8 wherein said sweep means includes an endless conveyor inclined at an acute angle to the descending path of travel of the stack of pads and said stack supporting flight, said conveyor having a run extending at said angle and spaced along one side of said stack and descending flight in the direction of said stack receiving table, pusher means for the stack pivotally mounted on said conveyor and means controlling the pivotal movement of said pusher to a retracted position from said stack and flight after the stack has been swept onto said table.

10. Apparatus according to claim 9 wherein said endless conveyor has a receding run following the end of said first run and a return run from the receding run at the start of the first run, said pusher means includes a bracket, a pivot post rigid with the bracket and pivotally mounted on said conveyor, a leading arm rigid with said pivot post and extending oppositely from said pusher and in the direction of movement of the pusher along said run and having a cam follower thereon, a trailing arm rigid with said pivot post and having a cam follower received in a track along said first run, a second track adjacent said receding run of the conveyor and having an arcuate lead in portion joining with a portion parallel to the receding run of the conveyor for receiving and guiding said leading cam follower, a third track at the end of said first track having an arcuate lead in portion joining with a portion paralleling said receding run and opposite from said second track for receiving and guiding said trailing cam follower and pivot spring biasing means for engagement by the trailing cam follower in its travel in the parallel position of the third track to insure that the trailing arm remains in a position trailing the leading arm for re-entry to said first run.

11. Apparatus according to claim 1 wherein said table means is movable vertically to receive successive accumulated stacks of pads from successive flights on said fifth conveyor and including means for moving said table means up and down.

12. Apparatus according to claim 1 wherein said means for erecting the flight of the sixth conveyor prior to their approach to said table has control means for moving it into one position to erect said flight and into another position to retract said flights, said later positioning for removal of a defective stack of pads deposited on said table.

13. An apparatus according to claim 1 wherein said sixth conveyor has endless conveyor means, said flights are brackets with pivot means mounting same to conveyor at leading end of bracket and having stop means on the bracket for engagement with the conveyor to limit backward moving of bracket to retracted position, rollers on the ends of the pivotal mounting means, at least one roller on each side of the rear bottom portion of said bracket in line with the leading rollers, a first track means on one side of the conveyor for said rollers, a second track means on the opposite side for said opposite rollers; said track means at said positions therealong of said retracting means for the flights having elongated gaps in said first and second track means opposite each other in line with the travel of said leading and trailing rollers on each side of a flight, said gaps being of longitudinal length slightly less than the longitudinal spacing between rollers on each side of the flight; said retracting means including a gap filler for one of said gaps at each retracting location and having track means for engaging at least the tops of said rollers, pivot means at the entrance end of said gap filler and biasing means urging said gap filler into pivoted open position whereby the leading roller in line with the gap filler enters the track means of the gap filler at its pivoted end and pivots the filler upward to gap filling position, said corresponding trailing roller is supported on said track means leading to the gap filler and as said leading rollers leaves the gap filler track said trailing roller on said bracket is urged to retract the flight as said biasing means pivots into gap opening position under influence of said biasing means and said flight is retracted, said other trailing roller being free to move in its open gap, said means for periodically stopping said first retracting means for retracting said flight including an arm member pivotally mounted under said gap filler at the first retracting means location, said arm having a gap filler engaging portion and means for periodically pivoting said arm to hold the gap filler in gap filling position against the action of said gap filler biasing means.

14. An apparatus according to claim 13 wherein said means for actuating said pivoted arm for pivoting to closed position said first gap filler is a power cylinder and rod means.

15. An apparatus for accumulating and packaging into a carton sanitary tapered pads of approximate isosceles trapezohedron shape comprising, in combination, a first conveyor means for conveying pads generally in line with wide ends to wide ends and short ends to short ends, a second conveyor means for receiving and conveying pads from the first conveyor means, a fence and support means parallel to the direction of travel of a third conveyor means and extending means in said second conveyor means positioning said pads alternately against the fence with one pad wide end abutting the fence and its axis normal to the fence and the next pad with its narrow end abutting the fence and its axis normal to the fence and the direction of movement of said conveyor; said third conveyor means for accumulating two oppositely disposed pads with two of the non-parallel sides abutting each other and the ends approximately adjacent each other whereby the other two sides are positioned parallel to each other; a fourth conveyor means adjacent said third conveyor means having pad grasping means for grasping said two accumulated pads and having a capsizing means for capsizing said two accumulated pads and stripping means for stripping said pads from said grasping means; a fifth conveyor means adjacent said fourth conveyor means and its stripping means for receiving said stripped pads from said grasping means, said fifth conveyor means having descending flights for receiving in timed relation and accumulating thereon a plurality of sets of said two abutting pads as a stack of pads; a table means adjacent said fifth conveyor for receiving a stack of pads therefrom; a sweep means positioned adjacent said fifth conveyor means and said table means for contacting and moving said accumulated stack of pads from said stack supporting flight onto said table means simultaneous while the accumulated stack of pads is descending; a sixth conveyor means adjacent said table means for accumulating stacks of pads and having pivotally movable flight means thereon for moving said stacks from said table means; a first means for retracting said last-mentioned flights positioned adjacent said table in the direction of flow of said stacks whereby a number of stacks of pads are accumulated to be pushed into a carton at a carton filling station; means for periodically stopping said first retracting means for retracting said accumulated stack of pads into the carton; a second means for retracting said flights at said carton filling station to retract any erect flights after they have pushed the accumulated stacks of pads into said carton and means for erecting said flights of the sixth conveyor as they return to move another stack of pads from said table.

16. Sanitary pad accumulating apparatus according to claim 15 wherein said third conveyor that accumulates two oppositely disposed pads has a first flight having trailing edge of pad contacting means disposed at an angle to the longitudinal axis of the third conveyor for contacting and moving a pad whose wider end abuts the fence into a position along said conveyor with the leading edge of the pad normal to the longitudinal axis of the conveyor, means for retracting said last mentioned first flight, a second flight having trailing edge of pad contact means disposed normal to the longitudinal axis of said third conveyor and moving a next pad whose narrow end abuts the fence into abutting contact with said first pad and moving the two accumulated pads into said grasping means and means for retracting said second flight into a position on said third conveyor to retract the flight after moving said abutting pads into said grasping means.

17. Sanitary pad accumulating apparatus according to claim 16 wherein said flights are L-shaped members with the leading end of leg of the L being pivotally attached to said third conveyor and the trailing end of the leg having a cam follower extending transversely therefrom and said retracting means for the flight using cam track receiving said cam follower.

18. Apparatus according to claim 15 wherein said third conveyor means includes a bottom of pad engaging longitudinal rod terminating at one end adjacent the entry end of the fourth conveyor and wherein said pad grasping means is a bracket attached to said third conveyor having a leading edge of pad engaging upstanding member, a longitudinal rear end plate extending on top of pad engaging member extending from said leading edge engaging member, a leaf spring member for guiding and engaging the bottom of said pad in a transverse member on said spring member for engagement underneath said bottom rod to hold down said spring member as said pads are received between said top member and spring member, said transverse portion on spring member leaving said terminal end of said rod allowing release of the spring member and the grasping of said pad.

19. An apparatus according to claim 15 wherein said flights on the fifth conveyor means have pivot means mounting them on an endless conveyor of the conveyor means, said conveyor having a horizontal run moving into a vertical descending run and means along the top run of the conveyor for pivoting the flights from the terminus of their horizontal run on a conveyor to the start of their descending run of the conveyor in an instantaneous snap action manner to avoid interference with grasping means on the fourth conveyor.

20. Apparatus according to claim 15 wherein said fifth conveyor has an endless conveyor with a top horizontal run, a vertical run adjacent said capsizing and stripping of the pads by the fourth conveyor and a return run, said flight on the conveyor being T-like in shape with cap of the T being pivoted to the conveyor, the leg of the T projecting out from the conveyor and under the grasping means to receive the stripped pads, the cap of the T at its end having a leading and a trailing roller extending transversely therefrom with the leading roller having an axle with a sear at one end, a fixed track for the roller along the top run of the conveyor, a swing track for the rollers between fixed track and the vertical run of the conveyor over which the rollers ride, said swing track being pivoted adjacent the end of the fixed track from which the rollers approach, spring means attached to the swing track tending to swing it upward, an arm pivoted adjacent the swing track pivot in a direction from which the flights approach and having its extending ends adjacent the top of the vertical run of the conveyor where the flights thereon receive the pads in a stack, said extending end of the arm having a top track with an upwardly extending recess in its ends extending over the vertical run of the conveyor for engaging the tops of the rollers and for engaging the tops of the trailing rollers and an elongated sear spaced therebelow for cooperation with said other sear and parallel to the top track overlapping the vertical run of the conveyor a lesser amount than the top track, said conveyor restraining the outward movement of the rollers and as said sear on the leading roller pivot slides off said elongated sear on the arm, said biased swing track causes the flight to instantaneously pivot about its mounting in a snap-like action to bring the flight into stack receiving position without interference with the immediately preceding pad conveyor.

21. Apparatus according to claim 15 wherein said sweep means includes an endless conveyor inclined at an angle to the descending path of travel of a stack of pads and said stack supporting flight, said conveyor having a run extending at said angle and spaced along one side of said track towards the direction of stack receiving table, pusher means for the stack pivotally mounted on said conveyor and means controlling the pivotal movement of said pusher to a retracted position on said stack after the stack has been swept onto said table.

22. Apparatus according to claim 21 wherein said endless conveyor has a receiving run following the end of said first run and a return run from the receiving run to the start of the first run, said pusher means includes a bracket, a pivot post rigid with the bracket and pivotally mounted on said conveyor, a leading arm rigid with said pivot post and extending oppositely from said pusher and in the direction of movement of the pusher along said run and having a cam follower thereon, a trailing arm rigid with said pivot post and having a cam follower received in a track along said run, a second track adjacent said receding run of the conveyor and having an arcuate lead-in portion joining with a portion parallel to the receiving run of the conveyor for receiving and guiding said leading cam follower, a third track at the end of said first track having an arcuate lead in portion joining with the portion paralleling said receiving run and opposite said second track for receiving and guiding said trailing cam follower and pivot biasing means for engagement by the trailing follower in its travel in the parallel position of the third track to insure that the trailing arm remains in position trailing the leading arm for re-entry into said first run.

23. Apparatus according to claim 15 wherein said table means is movable vertically to receive successive accumulated stack of pads from successive flights on said fifth conveyor and including means for moving said table means up and down.

24. Apparatus according to claim 15 wherein said means for erecting the flights of the sixth conveyor prior to their approach to said table has control means for moving it into one position to erect said flights and into another position to retract said flights, said latter positioning for removal of a defective stack of pads deposited on said table.

25. Apparatus according to claim 15 wherein said sixth conveyor has endless conveyor means, said flights having brackets with pivot means mounting same to conveyor at leading end of a bracket and having stop means on the bracket for engagement with the conveyor to limit backward swing of bracket to retracted position, rollers on the ends of the pivotal mounting means, at least one roller on each side of the rear bottom portion of said bracket in line with the leading rollers, a first track means on one side of the conveyor for said rollers, a second track means on the opposite side for said opposite rollers; said track means at said portions therealong of said retracting means for the flights having elongated gaps in said first and second track means opposite each other in line with the travel of said leading and trailing rollers on each side of a flight, said gap being of longitudinal length slightly less than the longitudinal spacing between rollers on each side, said retracting means including a gap filler for one of said gaps at each retracting location and having track means for engaging at least the tops of said rollers, pivot means at the entrance end of said gap filler and biasing means urging said gap filler into pivoted open position whereby the leading roller in line with the gap filler enters the track means of the gap filler at its pivoted end and pivots the filler upward to gap filling position, said corresponding trailing roller is supported on said track means leading to the gap filler and as said leading roller leaves the gap filler track, said trailing roller on said bracket is urged to retract the flight as said gap filler pivots into gap opening position under influence of said biasing means and said flight is retracted, said other trailing roller being free to move in its open gap, said means for periodically stopping said first retracting means for retracting said flight including an arm member pivotally mounted under said gap filler at the first retracting means location, said arm having a gap filler engaging portion and means for periodically moving said arm to hold the gap filler in gap filling position against the biasing action of the gap filler.

26. An apparatus according to claim 25 wherein said means for actuating said pivoted arm for pivoting to closed position said first gap filler is a power cylinder and rod means.

27. An apparatus for accumulating and packaging into a carton sanitary tapered pads of approximate isosceles trapezohedron shape comprising, in combination, a first conveyor means for accumulating two oppositely disposed pads with two of the non-parallel sides abutting each other and the ends approximately adjacent each other whereby the other two sides are positioned parallel to each other; a second conveyor means adjacent said first conveyor means having pad grasping means for grasping said two accumulated pads and having capsizing means for capsizing said two accumulated pads and stripping means for stripping said pads from said grasping means; a third conveyor means adjacent said second conveyor means and its stripping means for receiving said stripped pads from said pad grasping means, said third conveyor means having descending flights for receiving and accumulating thereon a plurality of sets of said two abutting pads as a stack of pads; a sweep means positioned adjacent said third conveyor means for contacting and moving said accumulated stack of pads onto a table means simultaneously while the accumulated stack of pads is descending; a fourth conveyor means adjacent said table means for accumulating stacks of pads and having pivotally movable flight means thereon for moving said stacks of pads from said table means; a first means for retracting said flights positioned adjacent said table in the direction of flow of said stacks whereby a number of stacks of pads are accumulated to be pushed into a carton at a carton filling station; means for periodically stopping said first retracting means for retracting said flights whereby the flights are erect to push said accumulated stack of pads into the carton and a second means for retracting said flights at said carton filling station to retract any erect flights.

28. A sanitary pad accumulator according to claim 27 wherein said first conveyor means has receiving means receiving said pads with their longitudinal axes normal to the longitudinal axes of movement of said first conveyor and said first conveyor having a first flight having contacting means disposed at an angle to the longitudinal axis of the conveyor for contacting and moving a first pad from said receiving means into a position along said conveyor with the leading edge of the pad normal to the longitudinal axis of the conveyor, means for retracting said last-mentioned first flight, a second flight having contacting means disposed normal to the longitudinal axis of the conveyor for contacting and moving a second pad from said receiving means into a position abutting said first pad with the trailing edge of the second pad normal to the longitudinal axis of the conveyor and moving the two pads into said grasping means and a retracting means for said second last-mentioned flight at a position on said conveyor to retract the same after moving said abutting pads into said grasping means.

29. An apparatus for accumulating and packaging into a carton tapered pads of approximate isosceles trapezohedron shape comprising, in combination, a first conveyor means for accumulating a plurality of such pads with their non-parallel sides abutting each other and the ends approximately adjacent each other whereby the exposed sides of the outer pads are positioned generally parallel to each other; a second conveyor means adjacent said first conveyor means having pad grasping means for grasping said plurality of accumulated pads and having capsizing means for capsizing said accumulated pads and stripping means for stripping said pads from said grasping means; a third conveyor means adjacent said second conveyor means and its stripping means for receiving said stripped pads from said grasping means, said third conveyor means having descending flights for receiving and accumulating thereon a plurality of sets of said plurality of abutting pads; a sweep means positioned adjacent said third conveyor means for contacting and moving said accumulated stack of pads onto a table means simultaneously while the accumulated stack of pads is descending; a fourth conveyor means adjacent said table means for accumulating stacks of pads and having pivotally movable flight means thereon for moving said stacks of pads from said table means, a first means for retracting said flights positioned adjacent said table in the direction of flow of said stacks whereby a number of stacks of pads are accumulated to be pushed into a carton at a carton filling station; means for periodically stopping said first retracting means for retracting said flights whereby the flights are erect to push said accumulated stack of pads into the carton and a second means for retracting said flights at said carton filling station to retract any erect flights.

30. A method of accumulating and packaging into a carton tapered pads of approximate isosceles trapezohedron shape comprising the steps of feeding said pads in spaced end to end relationship with wide ends to wide ends and short ends to short ends in line; transferring said pads at the end of said in line feeding at an angle to the line of feeding so that the successive pads have their axes parallel to each other and with their ends in a line normal to the axes of said pads; accumulating two oppositely disposed pads of the successive pads with two of their non-parallel sides abutting each other and the ends approximately adjacent each other thereby leaving the other two sides positioned parallel to each other; transferring and capsizing each accumulated pair of pads; accumulating in a stack pairs of each capsized pads, one pair on top of the preceding pair; transferring said accumulated stacks of pads to an in line accumulation of stacks and moving said accumulated stacks into an open end carton.

31. A method of accumulating and packaging into a carton tapered pads of approximate isosceles trapezohedron shape comprising the steps of accumulating a plurality of such pads as a set alternately disposed in sidewise abutting relation with the exposed sides of the end pads parallel to each other and the ends adjacent each other in approximate alignment; transferring and capsizing each accumulated set of pads; accumulating in a stack sets of such capsized pads, one set on top of the preceding set; transferring said accumulated stacks of pads to and in line accumulation of stacks and moving said accumulated stacks into an open end carton.

32. A conveyor means for moving stacks of pads received on a table comprising, in combination, an endless conveyor having pivotally mounted flight means thereon for moving said stacks from said table means, a first means for retracting said last-mentioned flights positioned adjacent said table in the direction of flow of said stacks whereby a number of stacks of pads are accumulated to be pushed into a carton at a carton filling station, means for periodically stopping said first retracting means for retracting said flights whereby the flights are left erect to push said accumulated stack of pads into the carton, a second means for retracting said flights at said carton filling station to retract any erect flights after they have pushed the accumulated stack of pads into said carton and means for erecting said flights of the conveyor as they return to move another stack of pads from said table.

33. Apparatus according to claim 32 wherein said means for erecting the flight of the conveyor prior to their approach to said table has control means for moving it into one position to erect said flight and into another position to retract said flights, said later positioning for removal of a defective stack of pads deposited on said table.

34. An apparatus for accumulating and packaging into a carton sanitary tapered pads of approximate isosceles trapezohedron shape comprising, in combination means for conveying said pads in spaced end to end relationship with wide ends to wide ends and short ends to short ends in line; angle transfer conveyor means at the discharge of said in line conveying means for depositing successive pads in side by side relationship at the end of said angle transfer conveyor, with successive pads oppositely disposed; a third conveyor means for accumulating two oppositely disposed pads with two of the non-parallel sides abutting each other and the ends approximately adjacent each other whereby the other two sides are positioned parallel to each other; a fourth conveyor means adjacent said third conveyor means having pad grasping means for grasping said two accumulated pads and having a capsizing means for capsizing said two accumulated pads and stripping mens for stripping said pads from said grasping means; a fifth conveyor means adjacent said fourth conveyor means and its stripping means for receiving said stripped pads from said grasping means, said fifth conveyor means having descending flights for receiving in timed relation and accumulating thereon a plurality of sets of said two abutting pads as a stack of pads; a table means adjacent said fifth conveyor for receiving a stack of pads therefrom; a sweep means positioned adjacent said fifth conveyor means and said table means for contacting and moving said accumulated stack of pads from said stack supporting flight onto said table means simultaneous while the accumulated stack of pads is descending; a sixth conveyor means adjacent said table means for accumulating stacks of pads and having pivotally movable flight means thereon for moving said stacks from said table means; a first means for retracting said last-mentioned flights positioned adjacent said table in the direction of flow of said stacks whereby a number of stacks of pads are accumulated to be pushed into a carton at a carton filling station, means for periodically stopping said first retracting means for retracting said flights whereby the flights are left erect to push said accumulated stack of pads into the carton, a second means for retracting said flights at said carton filling station to retract any erect flights after they have pushed the accumulated stacks of pads into said carton and means for erecting said flights of the sixth conveyor as they return to move another stack of pads from said table.

35. Sanitary pad accumulating apparatus according to claim 34 wherein said angle transfer conveyor means comprises an endless conveyor having a bottom run above said pads, depending pad engaging means carried in spaced relation by said conveyor, means for lowering said engaging means into transferring contact with oncoming pad, means to retract said engaging means as the pad reaches the end of said angle transfer conveyor and variable speed drive means for said conveyor to afford a velocity component at time of pad contact equal to speed of oncoming conveyor and pad, increasing the speed during removal of said pad from said first conveying means and decreasing the speed of pad travel on delivery of pad at end of said angle transfer conveyor.

References Cited

UNITED STATES PATENTS 3,249,206   5/1966   Mumma _____ 198—170

EVON C. BLUNK, *Primary Examiner.*

E. A. SROKA, *Assistant Examiner.*